US012768012B2

(12) United States Patent
Martin et al.

(10) Patent No.: US 12,768,012 B2
(45) Date of Patent: *Oct. 20, 2026

(54) ALUMINUM-CHROMIUM-ZIRCONIUM ALLOYS

(71) Applicant: HRL Laboratories, LLC, Malibu, CA (US)

(72) Inventors: John H. Martin, Oxnard, CA (US); Darby Laplant, Santa Monica, CA (US); Julie Miller, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1186 days.

This patent is subject to a terminal disclaimer.

(21) Appl. No.: 17/751,650

(22) Filed: May 23, 2022

(65) Prior Publication Data

US 2022/0282357 A1 Sep. 8, 2022

Related U.S. Application Data

(63) Continuation of application No. 17/121,601, filed on Dec. 14, 2020, now Pat. No. 12,421,576, which is a (Continued)

(51) Int. Cl.

*C22C 21/00* (2006.01)
*B33Y 80/00* (2015.01)

(Continued)

(52) U.S. Cl.

CPC ............ *C22C 21/00* (2013.01); *C22C 1/0416* (2013.01); *B33Y 10/00* (2014.12); *B33Y 70/00* (2014.12); *B33Y 80/00* (2014.12); *C22C 2202/00* (2013.01)

(58) Field of Classification Search

None

See application file for complete search history.

(56) References Cited

U.S. PATENT DOCUMENTS 5,305,726 A 4/1994 Scharman et al.
5,340,012 A 8/1994 Beeferman et al.

(Continued)

FOREIGN PATENT DOCUMENTS

JP 2011054892 A 3/2011
JP 2018184659 A 11/2018

(Continued)

OTHER PUBLICATIONS

Chen et al., “Rapid control of phase growth by nanoparticles,” Nature Communications 5:3879 DOI: 10.1038/ncomms4879.

(Continued)

*Primary Examiner* — Keith D. Hendricks
*Assistant Examiner* — Janell C Morillo
(74) *Attorney, Agent, or Firm* — O’Connor & Company; Ryan P. O’Connor

(57) ABSTRACT

Some variations provide an aluminum (Al) alloy containing at least 0.1 at % zirconium (Zr) and/or at least 0.1 at % chromium (Cr), wherein the aluminum alloy is in the form of an additively manufactured object. Other variations provide an aluminum-containing powder comprising Al particles, Cr particles, and Zr particles, wherein at least some of the Cr particles as well as at least some of the Zr particles are physically and/or chemically assembled on surfaces of the Al particles, and wherein the aluminum-containing powder contains at least 0.1 at % Zr and at least 0.1 at % Cr. In this invention, the combination of surface functionalization and additive manufacturing has fundamentally created a new (Continued)

composition space of valuable aluminum alloys. The disclosed Al alloys are strong, thermally stable, and corrosion-resistant.

4 Claims, 12 Drawing Sheets

Related U.S. Application Data continuation-in-part of application No. 16/784,890, filed on Feb. 7, 2020, now Pat. No. 12,037,669, and a continuation-in-part of application No. 16/565,570, filed on Sep. 10, 2019, now abandoned, and a continuation-in-part of application No. 16/294,579, filed on Mar. 6, 2019, now Pat. No. 11,674,204, and a continuation-in-part of application No. 16/262,891, filed on Jan. 30, 2019, now Pat. No. 11,578,389, and a continuation-in-part of application No. 16/262,886, filed on Jan. 30, 2019, now Pat. No. 11,286,543, and a continuation-in-part of application No. 15/996,438, filed on Jun. 2, 2018, now abandoned, and a continuation-in-part of application No. 15/880,466, filed on Jan. 25, 2018, now abandoned.

(60) Provisional application No. 62/968,238, filed on Jan. 31, 2020, provisional application No. 62/540,615, filed on Aug. 3, 2017, provisional application No. 62/452,989, filed on Feb. 1, 2017.

(51) Int. Cl.

| | |
|---|---|
| ***C22C 1/04*** | (2023.01) |
| *B33Y 10/00* | (2015.01) |
| *B33Y 70/00* | (2020.01) |

(56) References Cited

U.S. PATENT DOCUMENTS

| | | | |
|---|---|---|---|
| 5,462,712 A | 10/1995 | Langan et al. | |
| 6,024,915 A | 2/2000 | Kume et al. | |
| 6,071,628 A | 6/2000 | Seals et al. | |
| 6,254,757 B1 | 7/2001 | Lashmore et al. | |
| 6,368,427 B1 | 4/2002 | Sigworth | |
| 9,238,877 B2 | 1/2016 | Krause et al. | |
| 12,421,576 B2 * | 9/2025 | Martin | C22C 21/00 |
| 2002/0136884 A1 | 9/2002 | Oechsner | |
| 2003/0077473 A1 | 4/2003 | Bretschneider et al. | |
| 2003/0104147 A1 | 6/2003 | Bretschneider et al. | |
| 2005/0238528 A1 | 10/2005 | Lin et al. | |
| 2006/0065330 A1 | 3/2006 | Cooper et al. | |
| 2010/0288243 A1 | 11/2010 | Kaburagi et al. | |
| 2012/0135142 A1 | 5/2012 | Yang et al. | |
| 2012/0315399 A1 | 12/2012 | Feng et al. | |
| 2013/0012643 A1 | 1/2013 | Monsheimer et al. | |
| 2013/0146041 A1 | 6/2013 | Hijii et al. | |
| 2013/0152739 A1 | 6/2013 | Li et al. | |
| 2015/0252451 A1 | 9/2015 | Al-Aqeeli et al. | |
| 2015/0337423 A1 | 11/2015 | Martin et al. | |
| 2017/0016095 A1 | 1/2017 | Karlen et al. | |
| 2017/0252851 A1 | 9/2017 | Fulop et al. | |
| 2019/0161835 A1 | 5/2019 | Martin et al. | |
| 2020/0063241 A1 * | 2/2020 | Adachi | C22C 21/00 |
| 2021/0032727 A1 * | 2/2021 | Chehab | B23K 26/342 |

FOREIGN PATENT DOCUMENTS

| | | |
|---|---|---|
| KR | 1020080105250 A | 12/2008 |
| WO | 2005017220 A1 | 2/2005 |
| WO | 2019155165 A1 | 8/2019 |

OTHER PUBLICATIONS

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. 2011, 11, 4166-4174.

Högberg et al., "Reactive sputtering of δ-ZrH2 thin films by high power impulse magnetron sputtering and direct current magnetron sputtering," Journal of Vacuum Science & Technology A 2014, 32, 041510.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep 19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials 2017, 10, 919; doi:10.3390/ma10080919.

Roberts et al., "A novel processing approach for additive manufacturing of commercial aluminum alloys" Physics Procedia 83 ( 2016 ) 909-917.

Martin et al., "3D printing of high-strength aluminium alloys" Nature, vol. 549, Sep. 21, 2017.

Doi et al., "Gamma/Gamma-Prime Microstructure Formed By Phase Separation of Gamma-Prime Precipitates in A Ni—Al—Ti Alloy" Superalloys 2004, TMS (The Minerals, Metals & Materials Society), 2004.

Henderson et al., "Nickel based superalloy welding practices for industrial gas turbine applications", Science and Technology of Welding and Joining, 9:1, 13-21, 2004.

PCT/US2020/064970, Third Party Observation, filed Sep. 17, 2021.

Yan, "Strengthening Aluminum by Zirconium and Chromium", M.S. Thesis, Dec. 2012.

PCT/US2020/064970, Written Opinion of International Searching Authority, Mar. 29, 2021.

* cited by examiner

ALUMINUM-CHROMIUM-ZIRCONIUM ALLOYS

PRIORITY DATA

This patent application is a continuation application of U.S. patent application Ser. No. 17/121,601, filed on Dec. 14, 2020, which is a non-provisional application with priority benefit of U.S. Provisional Patent App. No. 62/968,238, filed on Jan. 31, 2020. U.S. patent application Ser. No. 17/121,601 is also a continuation-in-part application of U.S. patent application Ser. No. 16/784,890, filed on Feb. 7, 2020. U.S. patent application Ser. No. 17/121,601 is also a continuation-in-part application of U.S. patent application Ser. No. 16/565,570, filed on Sep. 10, 2019. U.S. patent application Ser. No. 17/121,601 is also a continuation-in-part application of U.S. patent application Ser. No. 15/996,438, filed on Jun. 2, 2018. U.S. patent application Ser. No. 17/121,601 is also a continuation-in-part application of U.S. patent application Ser. No. 16/262,891, filed on Jan. 30, 2019. U.S. patent application Ser. No. 17/121,601 is also a continuation-in-part application of U.S. patent application Ser. No. 16/294,579, filed on Mar. 6, 2019. U.S. patent application Ser. No. 17/121,601 is also a continuation-in-part application of U.S. patent application Ser. No. 15/880,466, filed on Jan. 25, 2018. U.S. patent application Ser. No. 17/121,601 is also a continuation-in-part application of U.S. patent application Ser. No. 16/262,886, filed on Jan. 30, 2019. All patent applications cited in this paragraph are hereby incorporated by reference herein for all purposes in their entireties.

FIELD OF THE INVENTION

The present invention generally relates to aluminum-chromium-zirconium alloys, feedstocks for aluminum-chromium-zirconium alloys, and methods of making and using aluminum-chromium-zirconium alloys.

BACKGROUND

Aluminum and its alloys are characterized by a relatively low density, high electrical and thermal conductivities, and a resistance to corrosion in some common environments, including the ambient atmosphere. Recent attention has been given to alloys of aluminum as engineering materials for transportation to reduce fuel consumption due to high specific strength. The low density (and therefore part weight) of aluminum is an advantage for weight-critical components.

There is a commercial desire for structures formed of aluminum alloys that exhibit high strength at elevated temperatures, such as 300° C. Such structures include, for example, aluminum-alloy structures in the propulsion and exhaust system of commercial and military aircraft that are exposed to elevated temperatures; aluminum-alloy structures of high-speed vehicles that are exposed to elevated temperatures due to aerothermal heating; and motor-vehicle powertrain aluminum-alloy parts that are exposed to elevated temperatures, such as pistons, connecting rods, cylinder heads, and brake calipers.

The mechanical strength of aluminum may be enhanced by cold work and by alloying. Common alloying elements include copper, magnesium, silicon, zinc, and manganese. Generally, aluminum alloys are classified as either cast or wrought. Some common cast, heat-treatable aluminum alloys include Al 295.0 and Al 356.0 (the decimal point denotes a cast alloy). Wrought alloys include heat-treatable alloys (e.g., Al 2104, Al 6061, and Al 7075) and non-heat-treatable alloys (e.g., Al 1100, Al 3003, and Al 5052). Heat-treatable aluminum alloys are generally superior in mechanical strength compared to other types of Al alloys.

Metal-based additive manufacturing, or three-dimensional (3D) printing, has applications in many industries, including the aerospace and automotive industries. Building up metal components layer by layer increases design freedom and manufacturing flexibility, thereby enabling complex geometries while eliminating traditional economy-of-scale constraints. However, limitations of printable alloys, especially with respect to specific strength, fatigue life, and fracture toughness, have hindered metal-based additive manufacturing. See Martin et al., "3D printing of high-strength aluminium alloys," *Nature vol.* 549, pages 365-369.

Specifically regarding aluminum alloys, printable aluminum alloys based on the binary Al—Si system tend to converge around a yield strength of approximately 200 MPa with a low ductility of 4%. Most aluminum alloys used in automotive, aerospace, and consumer applications are wrought alloys of the 2000, 5000, 6000, or 7000 series, which can exhibit strengths exceeding 400 MPa and ductility of more than 10% but have not commercially been additively manufactured. These systems have low-cost alloying elements (Cu, Mg, Zn, and Si) to produce complex strengthening phases during subsequent aging. These same elements promote large solidification ranges, leading to hot tearing (cracking) during solidification.

There is a desire for additively manufactured aluminum alloys that have good mechanical properties at elevated temperatures, for the aforementioned commercial applications and others. Previous attempts at high-temperature aluminum alloys rely on introduction of high-cost elements (e.g., Sc) or use of rapid solidification (e.g., to produce Al—Si—Fe—V) to form metastable high-temperature strengthening phases.

In particular, aluminum-chromium-zirconium (Al—Cr—Zr) alloys are predicted to have good mechanical strength. However, heretofore, attempts to make Al—Cr—Zr alloys have been limited with respect to composition due to the high melting points of Cr (1907° C.) and Zr (1855° C.) relative to aluminum (660° C.). This limitation is highlighted in Yan, "Strengthening Aluminum By Zirconium and Chromium" (2013), Masters Thesis, Worcester Polytechnic Institute, which is incorporated by reference. Yan notes the high thermal stability of Al—Cr—Zr alloys, but the hardness is low due to the inability to introduce high Cr and Zr contents.

Other techniques such as melt spinning and gas atomization have been used to process Al—Cr—Zr alloys, but these known techniques are limited due to the high casting temperatures required at elevated Cr and Zr concentrations. In particular, due to high liquidus temperatures associated with elevated Cr and Zr concentrations, temperatures that are hundreds of degrees Celsius over typical casting temperatures are necessary.

Given the commercial driver for high-strength, temperature-stable aluminum alloys and the theoretical (but heretofore unrealized) promise that is embodied by Al—Cr—Zr alloys with relatively high concentrations of Cr and/or Zr, there is a need for Al—Cr—Zr alloy compositions that have not been produced industrially or have not been enabled in the prior art. Additionally, feedstocks such as powders are needed for fabricating such Al—Cr—Zr alloys. Finally, methods of making the Al—Cr—Zr alloys with relatively high concentrations of Cr and/or Zr are needed.

SUMMARY

The present invention addresses the aforementioned needs in the art, as will now be summarized and then further described in detail below.

Some variations provide an aluminum (Al) alloy containing at least 0.1 at % zirconium (Zr) and/or at least 0.1 at % chromium (Cr), wherein the aluminum alloy is in the form of an additively manufactured object.

In some embodiments, the aluminum alloy contains at least 0.1 at % Zr.

In some embodiments, the aluminum alloy contains at least 0.1 at % Cr.

In some embodiments, the aluminum alloy contains at least 0.3 at % Cr and/or at least 0.3 at % Zr.

In some embodiments, the aluminum alloy contains at least 0.5 at % Cr and/or at least 0.5 at % Zr.

In some embodiments, the aluminum alloy contains at least 1.0 at % Cr and/or at least 1.0 at % Zr.

In some embodiments, the aluminum alloy contains at least 2.0 at % Cr and/or at least 2.0 at % Zr.

The Zr/Cr ratio may be selected from 0.1 to 10, such as from 0.2 to 2, for example.

In some embodiments, the aluminum alloy contains precipitated intermetallic Al—Cr particulates and/or precipitated intermetallic Al—Zr particulates.

In some embodiments, the aluminum alloy contains equiaxed grains nucleated by Cr and/or Zr.

The aluminum alloy may further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu.

In some embodiments, the aluminum alloy is characterized by a Vickers Pyramid Number (HV) of at least 50, such as at least 75.

In some embodiments, the aluminum alloy is characterized by a tensile strength of at least 250, 300, 350, 400, 450, 500, 550, 600, 650, or 700 MPa.

In some embodiments, the aluminum alloy is thermally stable at 300° C., 350° C., 400° C., 450° C., or 500° C.

In some embodiments, the aluminum alloy is corrosion-resistant.

In some embodiments, the aluminum alloy has a crack-free microstructure.

The additively manufactured object may be selected from the group consisting of a structural part, a coating, an ingot, a sheet, a plate, a rod, a wire, and combinations thereof, for example. Various structures may contain the additively manufactured object (aluminum alloy).

Some variations of the invention provide an aluminum (Al) alloy containing at least 0.1 at % zirconium (Zr) and at least 0.1 at % chromium (Cr), wherein the aluminum alloy is in the form of a fabricated object. The fabricated object is not necessarily an additively manufactured object.

In some embodiments, the aluminum alloy contains at least 0.25 at % Cr and/or at least 0.25 at % Zr.

In some embodiments, the aluminum alloy contains at least 0.3 at % Cr and/or at least 0.3 at % Zr.

In some embodiments, the aluminum alloy contains at least 0.5 at % Cr and/or at least 0.5 at % Zr.

In some embodiments, the aluminum alloy contains at least 1.0 at % Cr and/or at least 1.0 at % Zr.

In some embodiments, the aluminum alloy contains at least 2.0 at % Cr and/or at least 2.0 at % Zr.

The Zr/Cr ratio within the aluminum alloy may be selected from 0.1 to 10, such as from 0.2 to 2, for example.

The aluminum alloy may contain precipitated intermetallic Al—Cr particulates, precipitated intermetallic Al—Zr particulates, and/or precipitated intermetallic Zr—Cr particulates.

The aluminum alloy may contain equiaxed grains nucleated by Cr and/or Zr, in some embodiments.

The aluminum alloy may further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu.

The fabricated object may be selected from the group consisting of a structural part, a coating, an ingot, a sheet, a plate, a rod, a wire, and combinations thereof.

Other variations of the invention provide an aluminum-containing powder comprising:

(a) first particles that contain aluminum (Al), wherein the first particles have an average first-particle diameter;

(b) second particles that contain zirconium (Zr), wherein the second particles have an average second-particle diameter that is smaller than the average first-particle diameter; and (c) third particles that contain chromium (Cr), wherein the third particles have an average third-particle diameter that is smaller than the average first-particle diameter, and wherein the third particles are compositionally different than the second particles, wherein at least some of the second particles as well as at least some of the third particles are physically and/or chemically assembled on surfaces of the first particles, and wherein the aluminum-containing powder contains at least 0.1 at % Zr and at least 0.1 at % Cr.

In some embodiments, the aluminum-containing powder contains at least 0.3 at % Cr and/or at least 0.3 at % Zr.

In some embodiments, the aluminum-containing powder contains at least 0.5 at % Cr and/or at least 0.5 at % Zr.

In some embodiments, the aluminum-containing powder contains at least 1.0 at % Cr and/or at least 1.0 at % Zr.

In some embodiments, the aluminum-containing powder contains at least 2.0 at % Cr and/or at least 2.0 at % Zr.

Within the aluminum-containing powder, the Zr/Cr ratio may be selected from 0.1 to 10, such as from 0.2 to 2.

The first particles optionally further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu.

The aluminum-containing powder may further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu. These one or more additional elements may be contained within the first particles, the second particles, the third particles, or as additional particles, or a combination of the foregoing.

In some embodiments, the average second-particle diameter is at least an order of magnitude smaller than the average first-particle diameter.

In some embodiments, the average third-particle diameter is at least an order of magnitude smaller than the average first-particle diameter.

In some embodiments, the ratio of the average second-particle diameter to the average third-particle diameter is selected from 0.1 to 10.

In some aluminum-containing powders, at least 50 vol % of the second particles are physically and/or chemically assembled on surfaces of the first particles. In certain embodiments, at least 90 vol % or at least 99 vol % of the second particles are physically and/or chemically assembled on surfaces of the first particles.

In some aluminum-containing powders, at least 50 vol % of the third particles are physically and/or chemically assembled on surfaces of the first particles. In certain embodiments, at least 90 vol % or at least 99 vol % of the third particles are physically and/or chemically assembled on surfaces of the first particles.

In some embodiments, the aluminum-containing powder contains one or more intermetallic compounds of Zr and Cr.

In some embodiments, the second particles further contain Cr and/or the third particles further contain Zr. In these embodiments, the Cr and Zr may be present as a physical mixture, as an alloy, or as an intermetallic compound (e.g., $ZrCr_2$).

DETAILED DESCRIPTION OF EMBODIMENTS

Figure 1:
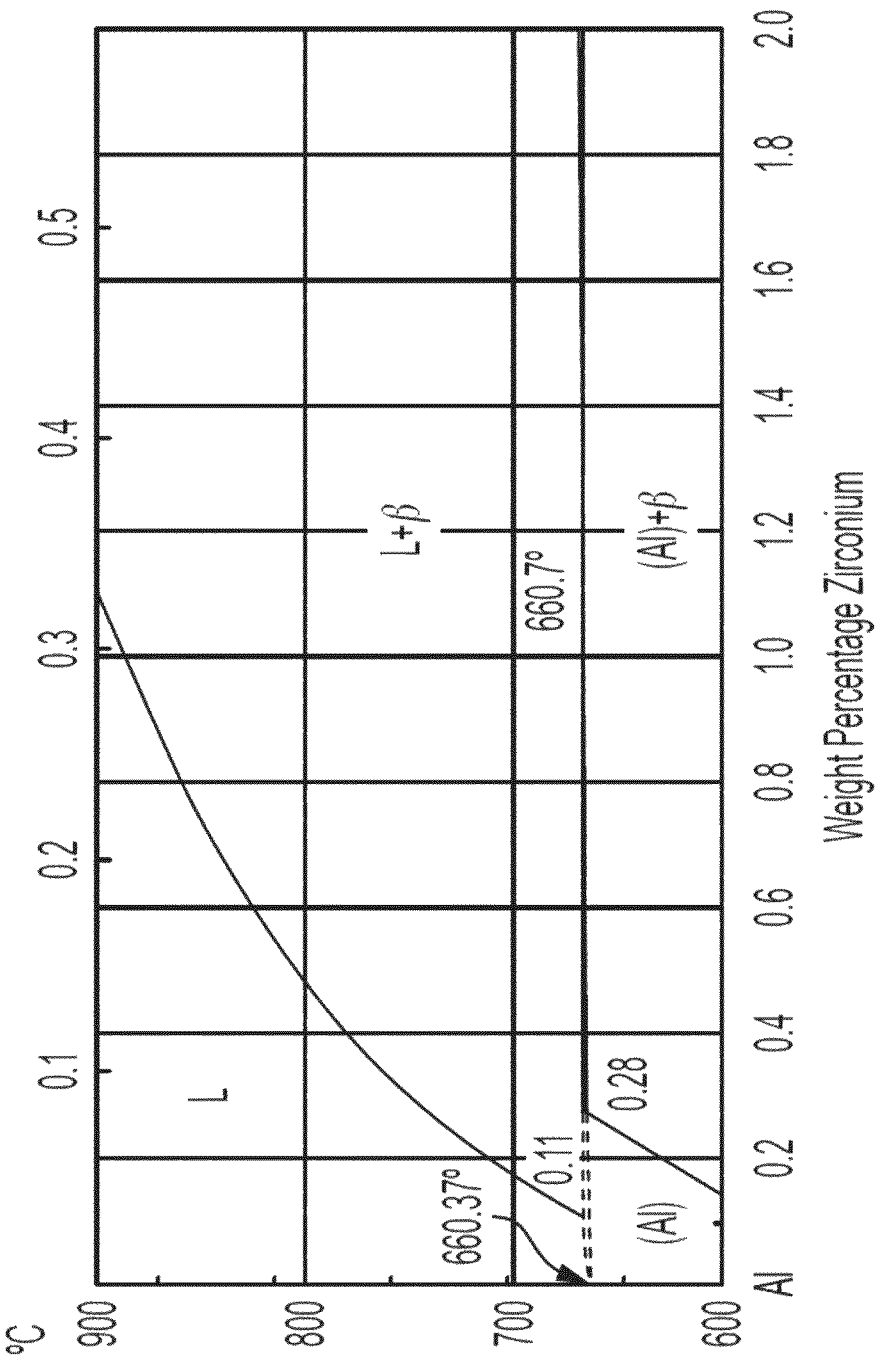
FIG. 1 shows the Al-rich side of the Al—Zr equilibrium phase diagram.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide a new aluminum alloy composition containing chromium (Cr) and zirconium (Zr) in a concentration of at least 0.1 at % for each of Cr and Zr, such as at least 0.2 at %, at least 0.3 at %, at least 0.4 at %, or at least 0.5 at % for each Cr and/or Zr. In this specification, at % is atomic percentage in the alloy. The base material of the aluminum alloy is aluminum (Al).

The peritectic nature of Cr and Zr makes the melting point of Al—Cr—Zr alloys extremely high. As described in detail in this specification, surface functionalization and additive manufacturing with fast solidification provide a convenient processing route to produce Al—Cr—Zr alloys that have high strength and good thermal stability. A new composition space has been discovered for Al—Cr—Zr alloys.

Figure 2:
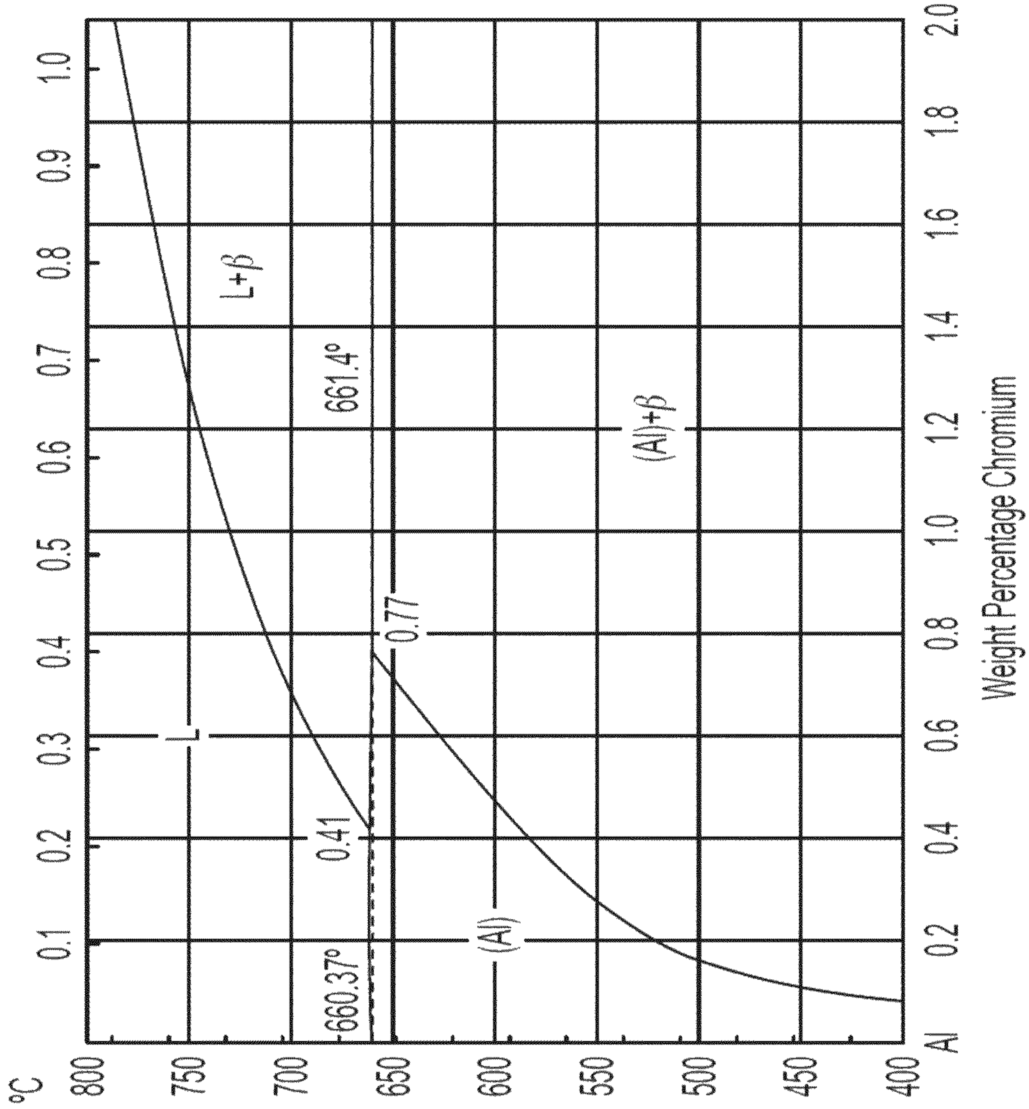
FIG. 2 shows the Al-rich side of the Al—Cr equilibrium phase diagram.

FIG. 1 shows the Al-rich side of the Al—Zr equilibrium phase diagram. FIG. 2 shows the Al-rich side of the Al—Cr equilibrium phase diagram. As shown in FIGS. 1 and 2, the peritectic nature of both the Al—Zr and Al—Cr systems indicate a significant increase in melting point with increasing concentration. This fact limits the processing of Al—Cr, Al—Zr, and Al—Cr—Zr alloys due to the reactive nature of the compositions and subsequent difficulty in processing reactive materials at high temperatures, particularly given the significant vapor pressure of Al at a temperature above about 800° C. Fully melting these alloys while avoiding significant coarsening of intermetallics requires holding Al melts above 1000° C. for long periods of time, making the processing both expensive and difficult.

The present invention, in some variations, solves the technical problem by utilizing functionalization of Al surfaces with Cr and/Zr, along with additive manufacturing or similar processing techniques. A short-lived (preferably less than 1 second), high-temperature (>1000° C.) melt pool with small Cr and Zr particles (preferably less than 100 microns) enables rapid dissolution or suspension of Cr and Zr elements into the melt. Subsequent fast solidification may provide solute trapping as well as precipitation of intermetallic Al—Cr and/or Al—Zr phases to provide additional strength. Notably, the disclosed processes are capable of producing aluminum alloys having Zr and/or Cr at concentrations greater than the respective equilibrium solubilities.

Solute trapping provides solid solution strengthening by adding atoms of Cr and/or Zr to the crystalline lattice of Al. The nucleation of dispersed intermetallics (e.g., Al—Cr and/or Al—Zr) provides dispersion strengthening (also called dispersion hardening) that restricts the movement of dislocations. Moreover, the use of Cr and Zr provides thermal stability due to the extremely low diffusivity of these species. The low diffusivity prevents or inhibits significant coarsening of the intermetallics at moderate temperatures (such as about 450° C. or less). In some embodiments, the aluminum alloy following additive manufacturing has sufficient strength and/or other mechanical properties. Optionally, subsequent heat treatments may be applied to precipitate at least some trapped solutes, to provide additional strengthening.

In addition to the base Al—Cr—Zr alloy, additional alloying elements may be added to provide additional strengthening or for other reasons. Optional additional alloy elements may include, but are not limited to, Cu, Mg, Zn, Li, Mn, Fe, Si, Ag, V, Nb, Ta, Ti, Hf, Nb, Mo, and W. For some elements, such as Ti, Cr, V, Zr, Nb, Mo, Hf, Ta, or W, the concentration may be relatively high compared to Cr and Zr, i.e. at least higher than those elements, with aluminum still the primary element in the alloy. Optional alloy elements may be in pure metal form or may be in hydride, oxide, nitride, carbide, sulfide, or boride form, for example.

Other elements on the periodic table may be used to improve the strength or other properties of this alloy. For example, the aluminum alloy may contain Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, Lu, or a hydride, oxide, nitride, carbide, sulfide, or boride thereof, or a combination of any of the foregoing. Typically, the aluminum alloy contains and tolerates trace contaminates from typical aluminum processing; that is, the starting aluminum may be, but is not necessarily, ultra-high purity. Typical trace elements in aluminum processing include Si and Fe. Preferably, total impurities in the final aluminum alloy are no greater than 1 wt %.

Some variations of the invention provide an aluminum (Al) alloy containing at least 0.1 at % zirconium (Zr) and/or at least 0.1 at % chromium (Cr), wherein the aluminum alloy is in the form of an additively manufactured object.

In some embodiments, the aluminum alloy contains at least 0.1 at % Zr. In some embodiments, the aluminum alloy contains at least 0.1 at % Cr. In some embodiments, the aluminum alloy contains at least 0.2 at % Cr and/or at least 0.2 at % Zr. In some embodiments, the aluminum alloy contains at least 0.3 at % Cr and/or at least 0.3 at % Zr. In some embodiments, the aluminum alloy contains at least 0.4 at % Cr and/or at least 0.4 at % Zr. In some embodiments, the aluminum alloy contains at least 0.5 at % Cr and/or at least 0.5 at % Zr. In some embodiments, the aluminum alloy contains at least 1.0 at % Cr and/or at least 1.0 at % Zr. In some embodiments, the aluminum alloy contains at least 2.0 at % Cr and/or at least 2.0 at % Zr.

In some embodiments, the aluminum alloy contains at least 0.9 at % Cr and/or at least 0.5 at % Zr. In certain embodiments, the aluminum alloy contains at least 0.85 at % Cr and/or at least 0.45 at % Zr. In certain embodiments, the aluminum alloy contains greater than 0.80 at % Cr and/or greater than 0.40 at % Zr.

In various embodiments, the aluminum alloy disclosed herein contains about, at least about, or at most about 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 at % Cr, including any intervening ranges or intermediate values not explicitly recited. In some embodiments, the aluminum alloy disclosed herein contains greater than 5 at % Cr, such as about 6, 7, 8, 9, 10, 15, 20, or 25 at % Cr.

In various embodiments, the aluminum alloy disclosed herein contains about, at least about, or at most about 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 at % Zr, including any intervening ranges or intermediate values not explicitly recited. In some embodiments, the aluminum alloy disclosed herein contains greater than 5 at % Zr, such as about 6, 7, 8, 9, 10, 15, 20, or 25 at % Zr.

In various embodiments incorporating both chromium and zirconium, the aluminum alloy disclosed herein contains about, at least about, or at most about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0 at % (Cr+Zr), including any intervening ranges or intermediate values not explicitly recited. In some embodiments, the aluminum alloy disclosed herein contains greater than 10 at % (Cr+Zr), such as about 11, 12, 13, 14, 15, 16, 17, 18, 19, 20, 25, 30, 35, 40, 45, or 50 at % (Cr+Zr).

When both Cr and Zr are present, the Zr/Cr ratio may be selected from 0.1 to 10, such as from 0.2 to 2, for example. In various embodiments, the Zr/Cr ratio is about 0.01, 0.05, 0.1, 0.2, 0.3, 0.4, 0.5, 0.6, 0.7, 0.8, 0.9, 1.0, 1.1, 1.2, 1.5, 2, 2.5, 3, 4, 5, 6, 7, 8, 9, 10, 15, 20, 25, 30, 40, 50, 60, 70, 80, 90, or 100, including all intervening ranges (e.g., 0.1-10 or 0.5-5).

In some embodiments, the aluminum alloy contains precipitated intermetallic Al—Cr particulates and/or precipitated intermetallic Al—Zr particulates. Exemplary intermetallic Al—Cr particulates include, but are not limited to, $Al_{11}Cr_2$, $Al_7Cr$, $Al_4Cr$, $Al_9Cr_4$, and $Al_8Cr_5$. Exemplary intermetallic Al—Zr particulates include, but are not limited to, $Al_3Zr$, $Al_2Zr$, $Al_3Zr_2$, and AlZr.

In some embodiments, the aluminum alloy contains equiaxed grains nucleated by Cr and/or Zr, directly or indirectly. Direct nucleation here refers to Cr and/or Zr nucleating grain growth, while indirect nucleation refers to intermetallic Al—Cr particulates and/or intermetallic Al—Zr particulates nucleating grain growth (which may be sequential or simultaneous with the reaction forming intermetallic species).

The aluminum alloy may further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu. Denoting such additional alloy element as X, the aluminum alloy may contains about, at least about, or at most about 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 at % X, including any intervening ranges or intermediate values not explicitly recited. When multiple elements X are present, each of the elements X may have a concentration as recited above, and the total concentration of all elements X may be as recited above or higher, such as about, or at least about, 5, 6, 7, 8, 9, 10, 15, or 20 at % X.

The Vickers Pyramid Number, also denoted as "HV", is a well-known measure of mechanical hardness of the aluminum alloy. See Smith et al., "An Accurate Method of Determining the Hardness of Metals, with Particular Reference to Those of a High Degree of Hardness," *Proceedings of the Institution of Mechanical Engineers*, Vol. I, 1922, pages 623-641, which is incorporated by reference. The standard units of HV are kilogram-force per square millimeter, which may be converted to other units of force per area.

In some embodiments, the aluminum alloy is characterized by a Vickers Pyramid Number of at least 50, such as at least 75. For example, the aluminum alloy may be characterized by a Vickers Pyramid Number of about, or at least about, 50, 55, 60, 65, 70, 75, 80, 85, 90, 95, 100, 105, 110, 115, 120, 125, 130, 135, 140, 145, or 150, including all intervening ranges (e.g., 80-130). These hardness values may characterize the as-built aluminum alloy, such as an additively manufactured aluminum alloy prior to aging.

The aluminum alloy may be aged. By "aged", "aging", "thermally aging", and the like, it is meant that the alloy is intentionally held at an elevated temperature (above 25° C.) for a period of time. During aging, the aluminum alloy may undergo precipitation hardening (also known as age hardening). The purpose of aging, in some embodiments, is to cause some amount of precipitation hardening for enhancement of mechanical properties, such as ultimate tensile strength, yield strength, or hardness. The heat treatment may cause stress relief while avoiding subsequent distortion or thickness-induced quench sensitivity effects. Preferably, the thermal aging leads to a uniform dispersion of intermetallic precipitates. Without being limited by theory, it is believed that strengthening is achieved by dispersion of intermetallic precipitates containing Al and Cr, and/or intermetallic precipitates containing Al and Zr, among other strengthening mechanisms that may occur. Al—Cr and Al—Zr precipitates are stable at temperatures above the melting point of aluminum and therefore are capable of providing strength at elevated temperatures—in contrast to other precipitates such as $MgZn_2$ or Guinier—Preston zones, which dissolve at elevated temperatures in aluminum alloys.

In some embodiments, a thermal aging treatment is similar to a T5 treatment of aluminum alloys. See Kaufman, *Introduction to Aluminum Alloys and Tempers*, ASM International (2000), which is hereby incorporated by reference for its teaching in chapter 4 of the Al alloy temper designation system. T5 refers to the aluminum alloy being strengthened by heat treatment, with or without subsequent strain hardening, wherein the alloy is cooled from an elevated-temperature shaping process then artificially aged. The "shaping process" may be additive manufacturing in the present context, and the "artificial aging" process is the intentional thermal aging of the alloy at a selected temperature and time. Avoiding a solution treatment is preferable, noting that a solution treatment is essentially impossible for hyper-peritectic systems.

In some embodiments, the aluminum alloy is aged at 200° C. for a period of time, such as from 1 hour to 80 hours, for example 2, 4, 6, 10, 20, 24, 30, 32, 40, 48, 50, 55, 60, 70, or 72 hours. The Vickers Pyramid Number after aging at 200° C. for at least 24 hours may be about, or at least about, 100, 110, 120, 130, or 140, for example, including all intervening ranges.

In some embodiments, the aluminum alloy is aged at 350° C. for a period of time, such as from 1 hour to 100 hours, for example 2, 4, 6, 10, 20, 24, 30, 32, 40, 48, 50, 60, 70, 72, 80, or 90 hours. The Vickers Pyramid Number after aging at 350° C. for at least 24 hours may be about, or at least about, 100, 110, 120, 130, 140, or 150, for example, including all intervening ranges.

In some embodiments, the aluminum alloy is aged at 400° C. for a period of time, such as from 1 hour to 100 hours, for example 2, 4, 6, 10, 20, 24, 30, 32, 40, 48, 50, 60, 70, 72, 80, or 90 hours. The Vickers Pyramid Number after aging at 400° C. for at least 24 hours may be about, or at least about, 110, 120, 130, 140, or 150, for example, including all intervening ranges.

In some embodiments, the aluminum alloy is aged at 500° C. for a period of time, such as from 1 hour to 50 hours, for example 2, 4, 6, 10, 20, 24, 30, 32, 40, or 48 hours. The Vickers Pyramid Number after aging at 500° C. for at least 24 hours may be about, or at least about, 110, 120, 130, 140, or 150, for example, including all intervening ranges.

In some embodiments, the aluminum alloy is characterized by a tensile strength of at least 200 MPa, preferably at least 250 MPa. Unless otherwise indicated, "tensile strength" herein refers to ultimate tensile strength (UTS). For example, the aluminum alloy may be characterized by a tensile strength of about, or at least about, 200, 225, 250, 275, 300, 310, 320, 325, 330, 335, 340, 350, 375, 400, 425, 450, 475, 500, 525, 550, 575, 600, 625, 650, 675, or 700 MPa, including all intervening ranges.

In some embodiments, the aluminum alloy is characterized by a yield strength of at least 150 MPa, preferably at least 200 MPa. For example, the aluminum alloy may be characterized by a yield strength of about, or at least about, 175, 200, 225, 250, 275, 300, 325, 350, 375, 400, 425, 450, 475, 500, 525, 550, 575, or 600 MPa, including all intervening ranges.

The aluminum alloy, when aged at a temperature of 350° C. for at least 4 hours, may be characterized by a tensile strength of at least 300 MPa, such as at least 310 MPa or at least 320 MPa. The aluminum alloy, when aged at a temperature of 350° C. for at least 32 hours, may be characterized by a tensile strength of at least 310 MPa, such as at least 320 MPa or at least 330 MPa. The aluminum alloy, when aged at a temperature of 400° C. for at least 2 hours, may be characterized by a tensile strength of at least 300 MPa, such as at least 310 MPa or at least 320 MPa.

The aluminum alloy may be characterized by a tensile strength after aging at 350° C. for at least 4 hours that is at least 10%, 15%, 20%, or 25% higher than the as-built aluminum alloy with no aging. The aluminum alloy may be characterized by a tensile strength after aging at 350° C. for at least 32 hours that is at least 10%, 15%, 20%, 25%, or 30% higher than the as-built aluminum alloy with no aging. The aluminum alloy may be characterized by a tensile strength after aging at 400° C. for at least 2 hours that is at least 10%, 15%, 20%, or 25% higher than the as-built aluminum alloy with no aging.

As discussed above, the aging conditions may vary, and the resulting mechanical properties may vary. One skilled in the art, with the benefit of this disclosure, will be able to carry out experiments to determine the optimal conditions for a given mechanical property.

In some embodiments, a thermally aged aluminum alloy is thermally stable at a use temperature, such as a temperature selected from 100-500° C. (e.g., 300° C.) that causes thermal exposure. Thermal stability in this disclosure refers to the resistance of the aluminum alloy to degradation of strength and hardness when subjected to long-term thermal exposure during extended use. Note that thermal exposure is different than the initial thermal aging utilized during production of the aluminum alloy. That is, optional thermal aging may be done to enhance mechanical properties of the aluminum alloy. Then, during use, the aluminum alloy in many cases is exposed to elevated temperatures.

One measure of thermal stability is room-temperature tensile strength, measured at 25° C., following thermal exposure. In preferred embodiments, the aluminum alloy retains at least 50%, preferably at least 75%, more preferably at least 90%, and most preferably at least 95% (potentially 100% or even more than 100%) of the room-temperature tensile strength, following exposure to a use temperature of about, or at least about, 200° C., 250° C., 300° C., 350° C., 400° C., 450° C., or 500° C.

Another measure of thermal stability is room-temperature yield strength, measured at 25° C., following thermal exposure. In preferred embodiments, the aluminum alloy retains at least 50%, preferably at least 75%, more preferably at least 90%, and most preferably at least 95% (potentially 100% or even more than 100%) of the room-temperature yield strength, following exposure to a use temperature of about, or at least about, 200° C., 250° C., 300° C., 350° C., 400° C., 450° C., or 500° C.

Yet another measure of thermal stability is room-temperature hardness, measured at 25° C., following thermal exposure. In preferred embodiments, the aluminum alloy retains at least 50%, preferably at least 75%, more preferably at least 90%, and most preferably at least 95% (potentially 100% or even more than 100%) of the room-temperature hardness, following exposure to a use temperature of about, or at least about, 200° C., 250° C., 300° C., 350° C., 400° C., 450° C., or 500° C.

The aluminum alloy may also be characterized by properties that are maintained at elevated temperatures (e.g., 300-1000° C.), following thermal exposure. Some applications require material use at high temperatures and possibly under transient spikes to even higher temperatures.

One measure of high-temperature thermal stability is high-temperature tensile strength, measured at 300° C., 400° C., or 500° C., following thermal exposure. In preferred embodiments, the aluminum alloy retains at least 50%, preferably at least 75%, more preferably at least 90%, and most preferably at least 95% of the high-temperature tensile strength, following exposure to a use temperature of about, or at least about, 200° C., 250° C., 300° C., 350° C., 400° C., 450° C., or 500° C. In related embodiments, the high-temperature tensile strength may be measured at a different, relevant temperature (besides 300° C.), such as 200° C., 400° C., 500° C., 600° C., or 650° C.

Another measure of high-temperature thermal stability is high-temperature yield strength, measured at 300° C., 400° C., or 500° C., following thermal exposure. In preferred embodiments, the aluminum alloy retains at least 50%, preferably at least 75%, more preferably at least 90%, and most preferably at least 95% of the high-temperature yield strength, following exposure to a use temperature of about, or at least about, 200° C., 250° C., 300° C., 350° C., 400° C., 450° C., or 500° C. In related embodiments, the high-temperature yield strength may be measured at a different, relevant temperature (besides 300° C.), such as 200° C., 400° C., 500° C., 600° C., or 650° C.

Yet another measure of high-temperature thermal stability is high-temperature hardness, measured at 300° C., 400° C., or 500° C., following thermal exposure. In preferred embodiments, the aluminum alloy retains at least 50%, preferably at least 75%, more preferably at least 90%, and most preferably at least 95% of the high-temperature hardness, following exposure to a use temperature of about, or at least about, 200° C., 250° C., 300° C., 350° C., 400° C., 450° C., or 500° C. In related embodiments, the high-temperature hardness may be measured at a different, relevant temperature (besides 300° C.), such as 200° C., 400° C., 500° C., 600° C., or 650° C.

In some embodiments, the aluminum alloy is corrosion-resistant. Al, Cr, and Zr all form highly stable oxides when exposed to air which is expected to limit the alloy reactivity with common environmental salts and/or with corrosive environments. Additionally, the added Cr and Zr solutes may increase the nobility of the aluminum, thereby providing a lower risk of galvanic corrosion (a benefit that makes the Al—Cr—Zr alloy more amenable to use in carbon-containing structures). Moreover, Cr and Zr are not anticipated to be electrochemically active at grain boundaries. Lower electrochemical activity decreases the tendency for intergranular corrosion and stress corrosion cracking.

In some embodiments, the aluminum alloy has a substantially crack-free microstructure. A "substantially crack-free" means that at least 99.9 vol % of the aluminum alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect. Typically, a crack contains open space, which may be vacuum or may contain a gas such as air, $CO_2$, $N_2$, and/or Ar. A crack may also contain solid material different from the primary material phase of the aluminum alloy.

The aluminum alloy microstructure may be substantially free of porous defects, in addition to being substantially crack-free. "Substantially free of porous defects" means at least 99 vol % of the aluminum alloy contains no porous voids having an effective diameter of at least 1 micron.

Preferably, at least 80 vol %, more preferably at least 90 vol %, even more preferably at least 95 vol %, and most preferably at least 99 vol % of the aluminum alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the aluminum alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, optionally to arrive at a final additively manufactured metal part that is substantially free of porous defects in addition to being substantially crack-free. The aluminum alloy or a part containing such alloy may have porosity from 0% to about 50%, for example, such as about 5%, 10%, 20%, 30%, 40%, or 50%, in various embodiments. The porosity may derive from space both within particles (e.g., hollow shapes) as well as space outside and between particles. The total porosity accounts for both sources of porosity.

In some embodiments, the aluminum alloy microstructure has "equiaxed grains" which means that at least 90 vol %, preferably at least 95 vol %, and more preferably at least 99 vol % of the aluminum alloy contains grains that are roughly equal in length, width, and height. In preferred embodiments, at least 99 vol % of the aluminum alloy contains grains that are characterized in that there is less than 50%, preferably less than 25%, more preferably less than 10%, and most preferably less than 5% standard deviation in each of average grain length, average grain width, and average grain height. In the aluminum alloy, crystals of metal alloy form grains in the solid. Each grain is a distinct crystal with its own orientation. The areas between grains are known as grain boundaries. Within each grain, the individual atoms form a crystalline lattice. Equiaxed grains can result when there are many nucleation sites arising from intermetallic precipitates (Al—Cr and/or Al—Zr) contained in the aluminum alloy microstructure.

The additively manufactured object may be selected from the group consisting of a structural part, a coating, an ingot, a sheet, a plate, a rod, a wire, and combinations thereof, for example. Various structures may contain the additively manufactured object (aluminum alloy).

Other variations of the invention provide an aluminum (Al) alloy containing at least 0.1 at % zirconium (Zr) and at least 0.1 at % chromium (Cr), wherein the aluminum alloy is in the form of a fabricated object that is not an additively manufactured object. The fabricated object may be selected from the group consisting of a structural part, a coating, an ingot, a sheet, a plate, a rod, a wire, and combinations thereof.

In some embodiments, the aluminum alloy contains at least 0.25 at % Cr and/or at least 0.25 at % Zr. In some embodiments, the aluminum alloy contains at least 0.3 at % Cr and/or at least 0.3 at % Zr. In some embodiments, the aluminum alloy contains at least 0.5 at % Cr and/or at least 0.5 at % Zr. In some embodiments, the aluminum alloy contains at least 1.0 at % Cr and/or at least 1.0 at % Zr. In some embodiments, the aluminum alloy contains at least 2.0 at % Cr and/or at least 2.0 at % Zr.

In some embodiments, the aluminum alloy contains at least 0.9 at % Cr and/or at least 0.5 at % Zr. In certain embodiments, the aluminum alloy contains at least 0.85 at % Cr and/or at least 0.45 at % Zr. In certain embodiments, the aluminum alloy contains greater than 0.80 at % Cr and/or greater than 0.40 at % Zr.

When both Cr and Zr are present in the fabricated object, the Zr/Cr ratio may be selected from 0.1 to 10, such as from 0.2 to 2, for example. In various embodiments, the Zr/Cr ratio is about 0.01, 0.05, 0.1, 0.2, 0.3, 0.4, 0.5, 0.6, 0.7, 0.8, 0.9, 1.0, 1.1, 1.2, 1.5, 2, 2.5, 3, 4, 5, 6, 7, 8, 9, 10, 15, 20, 25, 30, 40, 50, 60, 70, 80, 90, or 100, including all intervening ranges (e.g., 0.1-10 or 0.5-5).

In some embodiments, the aluminum alloy contains precipitated intermetallic Al—Cr particulates and/or precipitated intermetallic Al—Zr particulates. Exemplary intermetallic Al—Cr particulates include, but are not limited to, $Al_{11}Cr_2$, $Al_7Cr$, $Al_4Cr$, $Al_9Cr_4$, and $Al_8Cr_5$. Exemplary intermetallic Al—Zr particulates include, but are not limited to, $Al_3Zr$, $Al_2Zr$, $Al_3Zr_2$, and AlZr.

In some embodiments, the aluminum alloy contains equiaxed grains nucleated by Cr and/or Zr, directly or indirectly. Direct nucleation here refers to Cr and/or Zr nucleating grain growth, while indirect nucleation refers to intermetallic Al—Cr particulates and/or intermetallic Al—Zr particulates nucleating grain growth (which may be sequential or simultaneous with the reaction forming intermetallic species).

The aluminum alloy of the fabricated object may further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu.

Other variations of the invention provide an aluminum-containing powder comprising:

(a) first particles that contain aluminum (Al), wherein the first particles have an average first-particle diameter;

(b) second particles that contain zirconium (Zr), wherein the second particles have an average second-particle diameter that is smaller than the average first-particle diameter; and (c) third particles that contain chromium (Cr), wherein the third particles have an average third-particle diameter that is smaller than the average first-particle diameter, and wherein the third particles are compositionally different than the second particles, wherein at least some of the second particles as well as at least some of the third particles are physically and/or chemically assembled on surfaces of the first particles, and wherein the aluminum-containing powder contains at least 0.1 at % Zr and at least 0.1 at % Cr.

In some powders, the aluminum-containing powder contains at least 0.2 at % Cr and/or at least 0.2 at % Zr. In some powders, the aluminum-containing powder contains at least 0.3 at % Cr and/or at least 0.3 at % Zr. In some powders, the aluminum-containing powder contains at least 0.5 at % Cr and/or at least 0.5 at % Zr. In some powders, the aluminum-containing powder contains at least 1.0 at % Cr and/or at least 1.0 at % Zr. In some powders, the aluminum-containing powder contains at least 2.0 at % Cr and/or at least 2.0 at % Zr.

In some powders, the aluminum alloy contains at least 0.9 at % Cr and/or at least 0.5 at % Zr. In certain powder embodiments, the aluminum alloy contains at least 0.85 at % Cr and/or at least 0.45 at % Zr. In certain powder embodiments, the aluminum alloy contains greater than 0.80 at % Cr and/or greater than 0.40 at % Zr.

When both Cr and Zr are present in the starting powder, the Zr/Cr ratio may be selected from 0.1 to 10, such as from 0.2 to 2, for example. In various embodiments, the Zr/Cr ratio is about 0.01, 0.05, 0.1, 0.2, 0.3, 0.4, 0.5, 0.6, 0.7, 0.8, 0.9, 1.0, 1.1, 1.2, 1.5, 2, 2.5, 3, 4, 5, 6, 7, 8, 9, 10, 15, 20, 25, 30, 40, 50, 60, 70, 80, 90, or 100, including all intervening ranges (e.g., 0.1-10 or 0.5-5).

The first particles optionally further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu.

The aluminum-containing powder may further contain one or more elements selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu. These one or more additional elements may be contained within the first particles, the second particles, the third particles, or as additional particles, or a combination of the foregoing.

In some embodiments, the average second-particle diameter is at least an order of magnitude smaller than the average first-particle diameter. In various embodiments, the average second-particle diameter is at least 2×, 3×, 4×, 5×, 10×, 20×, 30×, 40×, 50×, or 100× smaller than the average first-particle diameter, including all intervening ranges.

In some embodiments, the average third-particle diameter is at least an order of magnitude smaller than the average first-particle diameter. In various embodiments, the average third-particle diameter is at least 2×, 3×, 4×, 5×, 10×, 20×, 30×, 40×, 50×, or 100× smaller than the average first-particle diameter, including all intervening ranges.

In some embodiments, the ratio of the average second-particle diameter to the average third-particle diameter is selected from 0.1 to 10. In various embodiments, the ratio of the average second-particle diameter to the average third-particle diameter is about 0.15, 0.2, 0.5, 0.8, 0.9, 1.0, 1.1, 1.2, 1.5, 2, 2.5, 3, 4, 5, 6, 7, 8, or 9, including all intervening ranges.

When the aluminum-containing powder further contains an additional alloy element X that is optionally selected from the group consisting of Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, B, C, N, O, H, S, Er, Pr, Nd, Sm, Gd, Tb, Dy, Ho, Tm, Yb, and Lu, the average X particle diameter may be at least an order of magnitude smaller than the average first-particle diameter. In various embodiments, the average X particle diameter is at least 2×, 3×, 4×, 5×, 10×, 20×, 30×, 40×, 50×, or 100× smaller than the average first-particle diameter, including all intervening ranges.

In some aluminum-containing powders, at least 50 vol % of the second particles are physically and/or chemically assembled on surfaces of the first particles. In certain embodiments, at least 90 vol % or at least 99 vol % of the second particles are physically and/or chemically assembled on surfaces of the first particles. In various embodiments, at least 5, 10, 15, 20, 25, 30, 40, 50, 60, 70, 80, 85, 90, 95, 98, 99, 99.5, 99.9, or 100 vol %, including all intervening ranges, of the second particles are physically and/or chemically assembled on surfaces of the first particles.

In some aluminum-containing powders, at least 50 vol % of the third particles are physically and/or chemically assembled on surfaces of the first particles. In certain embodiments, at least 90 vol % or at least 99 vol % of the third particles are physically and/or chemically assembled on surfaces of the first particles. In various embodiments, at least 5, 10, 15, 20, 25, 30, 40, 50, 60, 70, 80, 85, 90, 95, 98, 99, 99.5, 99.9, or 100 vol %, including all intervening ranges, of the third particles are physically and/or chemically assembled on surfaces of the first particles.

In some aluminum-containing powders, less than 5 vol % of the second particles are physically and/or chemically assembled on surfaces of the first particles. In these or other embodiments, less than 5 vol % of the third particles are physically and/or chemically assembled on surfaces of the first particles. In certain embodiments, none of the second particles, none of the third particles, or none of either the second or third particles are physically and/or chemically assembled on surfaces of the first particles. In such embodiments, surface functionalization may arise during powder processing, such as additive manufacturing.

In some embodiments, the aluminum-containing powder contains one or more intermetallic compounds of Zr and Cr. Exemplary intermetallic compounds include, but are not limited to, $Al_{11}Cr_2$, $Al_7Cr$, $Al_4Cr$, $Al_9Cr_4$, $Al_8Cr_5$, $AlCr_2$, $Al_3Zr$, $Al_2Zr$, $Al_3Zr_2$, AlZr, $AlZr_2$, $AlZr_3$. These intermetallic compounds may be present, for example, when a powder is made from a recycled component that contained Al—Cr and/or Al—Zr intermetallic precipitates, or when the starting powder is otherwise allowed to react.

In some embodiments, the second particles further contain Cr and/or the third particles further contain Zr. In these embodiments, the Cr and Zr may be present as a physical mixture, as an alloy, or as an intermetallic compound (e.g., $ZrCr_2$). In certain embodiments, when there are individual particles containing both Cr and Zr, those particles may be Cr that is surface-functionalized with Zr, or Zr that is surface-functionalized with Cr.

Various additional embodiments will now be described, without limiting the present invention. While most of the remainder of the specification will describe variations of the invention specific to additive manufacturing, it will be understood that the principles disclosed herein may be applied to joining techniques, such as welding, or other metal processing that melts and solidifies at least a portion of a starting powder or other feedstock.

Some variations utilize a high volume fraction of $Al_nX_m$ precipitates, wherein X is selected from Zr, Cr, or a combination thereof, and wherein n=1 to 15 and m=1 to 15. In various embodiments, there are $Al_nX_m$ precipitates in which X is not Zr or Cr but rather is selected from Cu, Mg, Zn, Li, Mn, Fe, Si, Ag, V, Nb, Ta, Ti, Hf, Mo, W, Sc, Y, Ca, Be, Sr, La, Ce, Re, Ru, Os, Co, Ni, Pd, Pt, Ir, Rh, Au, Cd, Sn, Bi, Pb, Er, Pr, Nd, Sm, Gd, Tb, Dy, Ho, Tm, Yb, or Lu, or hydrides, oxides, nitrides, carbides, sulfides, or borides thereof. In principle, an alloy element X may be selected from IUPAC (International Union of Pure and Applied Chemistry) Groups 3, 4, 5, 6, and/or lanthanide series of elements.

When the aluminum alloy contains precipitated intermetallic Al—Cr particulates and/or precipitated intermetallic Al—Zr particulates, and when there are other elements (besides Al, Cr, and Zr) present, there may additionally be precipitated intermetallic Al—X particulates for some or all of the other elements X.

When the aluminum alloy does not contain precipitated intermetallic Al—Cr particulates or precipitated intermetallic Al—Zr particulates, and when there are other elements (besides Al, Cr, and Zr) present, the other elements X may be present in precipitated intermetallic Al—X particulates.

In some embodiments of an aluminum alloy, one or more X elements are present at concentrations above their solubility limit(s) in aluminum. Without limitation, variations of the invention enable aluminum alloys with X element fractions above equilibrium solubility limits by adding small particles containing the X elements to a powder of the remaining constituents of the target alloy, and then additively manufacturing the parts.

In some embodiments, the X elements are initially provided in 0.01-20 micron powder form, and blended with 10-500 micron powder of the other desired constituents of the aluminum alloy feedstock. The powder feedstock may be subsequently processed by additive manufacturing to fabricate a desired part, or potentially to make an aluminum alloy object that itself may be a feedstock for a future process.

The additively manufactured aluminum alloy preferably contains intermetallic precipitates of Al—Cr and/or Al—Zr, preferably uniformly dispersed throughout the additively manufactured aluminum alloy. Uniform distributions of these precipitates at high volume fractions have not been possible to achieve with conventional processing. The reason for that is Al—Cr and Al—Zr precipitates are not generated at a large weight fraction because the solubilities of Cr and Zr in Al are each on the order of 0.1 wt %. This limitation may be overcome by adding small particles containing Cr and/or Zr to surfaces of the remaining constituents of the target alloy, and then additively manufacturing the parts.

Some variations of the invention provide an aluminum alloy comprising aluminum and from about 0.1 wt % to about 60 wt % of one or more alloy elements X selected from the group consisting of Cr, Zr, Ti, Hf, V, Ta, Nb, Mo, W, Sc, Y, La, Ce, Pr, Nd, Sm, Eu, Gd, Tb, Dy, Ho, Er, Tm, Yb, Lu, and combinations or alloys of any of the foregoing, wherein at least one X element is Cr or Zr. The aluminum alloy may comprise at least two, at least three, at least four, at least five, or more of the alloy elements X. Preferably, at least one of the alloy elements X is present as intermetallic precipitates containing Al and X within the aluminum alloy. The wt % is based on the total weight concentration, on an elemental basis, of the alloy elements X (i.e., in a compound containing X, only the weight of elemental X is counted).

The intermetallic precipitates may be $Al_nX_m$ (n=1 to 15, m=1 to 15) precipitates. The value of n may be 1, 2, 3, 4, 5, 6, 7, 8, 9, 10, 11, 12, 13, 14, and/or 15. Independently, the value of m may be 1, 2, 3, 4, 5, 6, 7, 8, 9, 10, 11, 12, 13, 14, and/or 15. For example, in some embodiments, the intermetallic precipitates are $Al_3X$ precipitates (e.g., $Al_3Zr$).

The melting points of Zr, Ti, Hf, V, Ta, Nb, Cr, Mo, W, Sc, Y, La, Ce, Pr, Nd, Sm, Eu, Gd, Tb, Dy, Ho, Er, Tm, Yb, and Lu all exceed the melting point of Al, which is about 660° C. For example, the melting point of Zr is 1855° C. It is preferred that the alloy elements, and intermetallic precipitates formed from them, have a higher melting point than aluminum because the intention is usually that during additive manufacturing, the X elements do not melt but rather form intermetallic inclusions, which themselves have a higher melting point than aluminum and thus also do not melt.

In some embodiments, one or more alloy elements X is present at a total weight concentration that exceeds its equilibrium solubility in aluminum, calculated at 750° C. and 1 bar. When more than one alloy element X is present, some or all of the X elements may exceed their equilibrium solubilities in aluminum, calculated at 750° C. and 1 bar. When more than one alloy element X is present, at least one element X is preferably present as an intermetallic precipitate containing Al and X, while other elements X may or may not be in the form of intermetallic precipitates.

Equilibrium solubilities of X elements in aluminum are known. For example, see *Smithells Metals Reference Book*, Eds. Gale and Totemeier, Eighth Edition, 2004 (hereinafter, "Smithells") which is hereby incorporated by reference (along with all internal citations) herein for all purposes. In particular, chapter 11 of Smithells includes many binary equilibrium phase diagrams that are applicable to the present disclosure.

For example, the equilibrium phase diagram of the Al—Zr system at page 11-58 of Smithells indicates the following intermetallic precipitates, in order of increasing zirconium content: $Al_3Zr$, $Al_2Zr$, $Al_3Zr_2$, AlZr, $Al_3Zr_5$, $Al_2Zr_3$, $Al_3Zr_4$, $Al_4Zr_5$, $AlZr_2$, and $AlZr_3$. Thus in embodiments for which X=Zr, any of these intermetallic precipitates may form or be present as inclusions in the aluminum alloy, even if not predicted to be present at thermodynamic equilibrium (e.g., for kinetic reasons). The equilibrium phase diagram of the Al—Cr system is at page 11-35 of Smithells.

Liquid aluminum has a very limited solubility for X at typical casting temperatures (e.g., 670° C. to 800° C.). For example, the solubility of the elements Zr, Ta, V, Nb, Hf, and Ti in liquid Al at about 670° C. is only about 0.1 wt %, according to Smithells.

At X concentrations above about 0.1 wt %, but less than about 60 wt %, and at temperatures for which aluminum is melted, there is typically not a single liquid phase at equilibrium but rather a liquid phase and an Al—X phase. That is, when more of an X element is present than its solubility limit, Al—X will form in the liquid, at equilibrium. Unless the temperature is so high that Al—X itself melts, Al—X will be in the form of solid precipitates. The melting point of $Al_3Zr$, for example, is 1580° C., which is much higher than typical processing temperatures of less than 1000° C., e.g. 670-800° C. Solid precipitates are desirable unless the concentration of Al—X becomes too high such that the precipitates agglomerate in the liquid aluminum. Agglomeration of Al—X precipitates creates large chunks with diameters larger than 100 microns, which is referred to herein as coarsening of the precipitates.

Generally speaking, only small Al—X precipitates (100 microns or less) are desirable in aluminum alloys in order to increase the strength. Large precipitates (greater than 100 microns) are usually detrimental—at least for purposes of strength, since such large precipitates are often brittle. In certain cases, such as when strength is not a critical factor, the intermetallic precipitates (or a portion of them) may be larger than 100 microns, such as about 150, 200, 250, 300, 400, or 500 microns.

To strengthen the aluminum alloy while maintaining ductility, a substantially uniform distribution of small Al—X precipitates is desired. Preferably, the Al—X precipitates are less than 100 μm in average size, and more preferably less than 10 μm in average size. Uniform distribution of intermetallic precipitates means that they are randomly dispersed throughout the aluminum alloy, and the local concentration of intermetallic precipitates within any selected region of aluminum alloy is statistically the same as any other arbitrary region of aluminum alloy.

In general, more Al—X precipitates (i.e., $Al_nX_m$ precipitates) will lead to higher strength until a threshold is reached at which coarsening occurs rather than stabilization of independent precipitates. The threshold concentration will depend on the identity of alloy elements (i.e., Cr, Zr, and optionally others), the diffusivity of the precipitate species within the aluminum-rich matrix, and the temperature and temperature history of the process.

Note that at very high X concentrations (typically greater than 60 wt %), a stable X solid phase may form. For example, in the case of zirconium in aluminum, at about 90 wt % Zr (10 wt % Al), a stable β-Zr phase forms. Because the present invention utilizes an aluminum alloy with preferably 0.1-60 wt % X elements, the alloy would not be expected to contain a thermodynamically stable β-Zr phase at equilibrium. However, in embodiments which include Zr, zirconium (free of aluminum) metallic inclusions may form even if not predicted to be present at thermodynamic equilibrium (e.g., for kinetic reasons).

In some embodiments, one or more X elements are present at concentrations high above their equilibrium solubility limit in aluminum, such as 2×, 3×, 5×, 10×, 25×, 50×, or 100× of the equilibrium solubility calculated at a temperature of 750° C. and a pressure of 1 bar, for example. As an illustration, if the equilibrium solubility limit of X is about 0.2 wt % in aluminum at 750° C. and 1 bar, then the aluminum alloy may comprise about 0.4 wt %, about 0.6 wt %, about 1 wt %, about 2 wt %, about 5 wt %, about 10 wt %, or about 20 wt %, respectively, of the alloy element X on an elemental weight basis.

When more than one X element is present, the equilibrium phase diagrams become more complex due to thermodynamic interactions between each X element with Al, and between all X elements. On page 11-533, Smithells states that "the literature is very large" and provides a list of references. One skilled in the materials-science art will understand that aluminum alloy multicomponent phase diagrams may be found in the literature, or if not readily available, may be generated via experimentation.

As suggested above, non-equilibrium phases may be present due to kinetic limitations (e.g., reaction kinetics and/or mass-transfer rates) that prevent equilibrium among all materials present. The present invention is not limited to any systems being at thermodynamic equilibrium and does not preclude non-equilibrium phases being present in any of the aluminum alloys or precursors thereof. In some cases, a non-equilibrium composition is desired. As is known, whether a metal alloy system will reach true thermodynamic equilibrium is dictated by kinetic constraints including temperature, time, and the presence of catalysts or nucleation sites. Even when a new phase is predicted in a phase diagram, atomic rearrangements via diffusion are necessary, and there is an increase in energy associated with the phase boundaries that are created between parent and product phases. This energy must be overcome, such as via heat transfer. In some embodiments, additive manufacturing is carried out using an effective temperature profile and time such that the aluminum alloy fabricated has a composition predicted by equilibrium.

In some embodiments, the intermetallic precipitates are characterized by an average effective diameter of less than 100 microns. In various embodiments, the intermetallic precipitates are characterized by an average effective diameter of about 10 microns or less, about 1 micron or less, or about 100 nanometers or less. In some embodiments, the intermetallic precipitates are characterized by an average effective diameter of about, or at least about, 0.01 microns, 0.1 microns, 0.5 microns, 1 micron, 5 microns, 10 microns, 20 microns, 50 microns, or 75 microns. In various embodiments, the intermetallic precipitates are characterized by an average effective diameter from about 0.1 microns to about 100 microns, or about 0.1 microns to about 50 microns, or about 0.1 microns to about 20 microns, or about 0.1 microns to about 10 microns, or about 1 micron to about 100 microns, or about 1 micron to about 50 microns, or about 1 micron to about 20 microns, or about 1 micron to about 10 microns. The intermetallic precipitates may also be very small, such as from about 0.001 microns (1 nanometer) to about 0.1 microns (100 nanometers).

The aluminum alloy further may comprise from about 0.1 wt % to about 15 wt % of one or more additional alloy elements selected from the group consisting of Zn, Si, Mg, Cu, Li, Ag, Mn, Fe, Co, Ni, Sn, Sb, Bi, Pb, B, C, Ir, Os, Re, Ca, Sr, Be, and combinations or alloys of any of the foregoing, wherein wt % is based on the total weight concentration, on an elemental basis, of the additional alloy elements. In various embodiments, the aluminum alloy comprises about, or at least about, 0.2, 0.5, 1, 2, 3, 4, 5, 6, 7, 8, 9, 10, 11, 12, 13, or 14 wt % of such one or more additional alloy elements.

The one or more additional alloy elements, when present, may be added for a wide variety of reasons. For example, elements such as Mn may provide solid solution strengthening, Mg and Zn may form $MgZn_2$ precipitates, Cu may form θ-phase precipitates, and Si may form immiscible Si structures. Typical precipitation additions (e.g., Mg, Zn, and/or Cu), as well as other less common precipitate systems and alloy additions (e.g., Fe, Co, Ni, Ag, Li, Sn, Sb, Bi, Pb, B, C, Ir, Os, Re, Ca, Sr, and/or Be) may be added to the alloy to form not only strengthening precipitates, but also to dissolve at the desired operating temperature in order to provide solid solution strengthening. Additionally, these elements may segregate to precipitate boundaries, thereby decreasing the activity of these boundaries and providing an energy barrier that inhibits coarsening, giving improved properties at elevated temperatures for longer durations without microstructural degradation.

In addition to the intermetallic precipitates containing Al—Cr and/or Al—Zr, other precipitates may contain inclusions of metal X with another element besides Al. For example, X-containing precipitates may be ceramics formed from metal X, and/or X hydrides, X carbides, X oxides, X nitrides, X borides, X sulfides, or combinations thereof. An exemplary ceramic is zirconium dioxide, $ZrO_2$.

Non-metal inclusions may also be present in the aluminum alloy, in addition to the intermetallic precipitates and any other metal alloy elements. Such non-metal inclusions may include ceramics, hydrides, carbides, oxides, nitrides, borides, sulfides, or combinations thereof (e.g., silicon carbide, silicon nitride, boron oxide, etc.).

The aluminum alloy may be an additively manufactured aluminum alloy. In other embodiments, the aluminum alloy may be a welded aluminum alloy. In some embodiments, the aluminum alloy forms a feedstock alloy (e.g., a feedstock ingot) intended for a future process, such as additive manufacturing.

The aluminum alloy may be present in an aluminum alloy-based part, sheet, or structural object. An aluminum alloy-based part or structural object is preferably an additively manufactured part or structural object. The aluminum alloy may be selected from the group consisting of a sintered structure, a coating, a geometric object, a billet, an ingot, a net-shape part, a near-net-shape part, and combinations thereof.

Some variations of the invention provide a feedstock powder for an aluminum alloy, the feedstock powder comprising:

(a) from about 80 wt % to about 99.9 wt % of an aluminum-containing base powder, wherein the aluminum-containing base powder has an average base particle size from about 10 microns to about 500 microns, and wherein the aluminum-containing base powder contains at least 75 wt % (e.g., at least 80 wt % or at least 85 wt %) aluminum; and (b) from about 0.1 wt % to about 20 wt % of an alloying powder, wherein the alloying powder has an average alloy particle size from about 0.01 microns to about 90 microns, wherein the alloying powder contains at least 50 wt % (based on the total weight concentration, on an elemental basis) of one or more alloy elements X selected from the group consisting of Cr, Zr, Ti, Hf, V, Ta, Nb, Mo, W, Sc, Y, La, Ce, Pr, Nd, Sm, Eu, Gd, Tb, Dy, Ho, Er, Tm, Yb, Lu; hydrides, carbides, oxides, nitrides, borides, or sulfides thereof; and combinations or alloys of any of the foregoing, wherein at least one X element is Cr or Zr, wherein if the average alloy particle size is larger than 20 microns, then the average alloy particle size is preferably smaller than the average base particle size, and wherein the aluminum-containing base powder and the alloying powder are in intimate physical contact within the feedstock powder.

The "base powder" contains at least aluminum present in powder particles. The base powder has a composition that is calculated to contain the constituents that will form the target alloy composition when combined with the intended fraction of alloying powder. The "alloying powder" is rich in Cr and/or Zr and typically has a smaller particle size than the base powder.

A feedstock powder may be in any form in which discrete particles can be reasonably distinguished from the bulk. The powder may be present as loose powders, a paste, a suspension, or a green body, for example. A green body is an object whose main constituent is weakly bound powder material, before it has been melted and solidified. Particles may be solid, hollow, or a combination thereof. Particles can be made by any means including, for example, gas atomization, milling, cryomilling, wire explosion, laser ablation, electrical-discharge machining, or other techniques known in the art.

"Intimate physical contact" between the base powder and the alloying powder means that the two powders are physically blended (mixed) together, to form the feedstock powder. In some embodiments, there are chemical bonds between alloy particles and base powder particles. Chemical bonding results in intimate physical contact between the alloying powder and the aluminum-containing base powder.

Some embodiments of the present invention utilize materials, methods, and principles described in commonly owned U.S. patent application Ser. No. 15/209,903, filed Jul. 14, 2016, and/or commonly owned U.S. patent application Ser. No. 15/808,877, filed Nov. 9, 2017, each of which is hereby incorporated by reference herein. For example, certain embodiments utilize functionalized powder feedstocks as described in U.S. patent application Ser. No. 15/209,903. The present disclosure is not limited to those functionalized powders. This specification also hereby incorporates by reference herein Martin et al., "3D printing of high-strength aluminium alloys," *Nature vol.* 549, pages 365-369 and supplemental online content (extended data), Sep. 21, 2017, in its entirety.

In some embodiments, alloying powder particles coat base powders in the form of a continuous coating or an intermittent coating, either of which may be referred to as a surface-functionalized base powder. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random). In general, the coating may be continuous or discontinuous.

Methods of producing surface-functionalized powder materials are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein.

In some embodiments, the feedstock powder is provided such that the aluminum-containing base powder and the alloying powder initially are physically separated, such as in different containers, for storage or transport. At the time and place of use as a feedstock for making an aluminum alloy (e.g., at a site of additive manufacturing), the individual powders may then be blended together so that the aluminum-containing base powder and the alloying powder are in intimate physical contact with each other. The alloying powder and base powder are mixed or blended at respective amounts in order to result in the target aluminum alloy composition. This is the typical, preferred embodiment that enables the generation of intermetallic precipitates uniformly dispersed throughout the additively manufactured aluminum alloy. However, in certain situations in which a non-uniform dispersion is desired, it may be beneficial for the feedstock powder to contain regions of lower or higher concentrations of alloying powder, such as to produce a gradient of alloy composition in the final component.

In some embodiments, the average base particle size is from about 10 microns to about 100 microns. In various embodiments, the average base particle size is from about 10 microns to about 200 microns, from about 5 microns to about 100 microns, or from about 5 microns to about 50 microns. In various embodiments, the average base particle size is about, or at least about, 1 micron, 5 microns, 10 microns, 20 microns, 50 microns, 100 microns, 200 microns, 300 microns, or 400 microns.

The base powder (base particles) may have a narrow or wide particle-size distribution, although a narrow size distribution is usually preferred. The particle-size distribution may be characterized by a particle-size dispersity index, which is the ratio of particle-size standard deviation to average particle size (also known as the coefficient of variance). In various embodiments, the base powder particle-size dispersity index is about 0.05, 0.1, 0.2, 0.3, 0.4, 0.5, 0.6, 0.7, 0.8, 0.9, or 1.0.

The particle-size distribution of the base powder may also be characterized by reference to D10, D50, and D90, for example. D10 is the diameter where ten percent of the distribution has a smaller particle size and ninety percent has a larger particle size. D50 is the diameter where fifty percent of the distribution has a smaller particle size and fifty percent has a larger particle size. D90 is the diameter where ninety percent of the distribution has a smaller particle size and ten percent has a larger particle size. An exemplary base powder for additive manufacturing via selective laser melting has D10=20 microns and D90=60 microns. In various embodiments, D10 is about 1, 5, 10, 20, 30, 40, or 50 microns while D90 is about 5, 10, 20, 30, 40, 50, 60, 70, 80, 90, or 100 microns.

The aluminum-containing base powder preferably contains base particles that are nominally spherical. By "nominally spherical" it is meant that the base particles, on average, have a sphericity of at least 0.9, preferably at least 0.95, and more preferably at least 0.99. Sphericity is the measure of how closely the shape of an object approaches that of a perfect sphere. The sphericity of a particle is the ratio of the surface area of a reference sphere, having the same volume as the given particle, to the surface area of the particle. The sphericity of an ideal sphere is exactly 1. As a negative example, the sphericity of a perfect cube is about 0.8, which means a cubic particle is not nominally spherical as defined herein.

In some embodiments, the average alloy particle size is from about 0.01 microns to about 50 microns. In various embodiments, the average alloy particle size is from about 0.01 microns to about 20 microns, from about 0.01 microns to about 10 microns, or from about 0.01 microns to about 1 micron. In various embodiments, the average alloy particle size is about 10 microns or less, about 1 micron or less, about 100 nanometers or less, about 50 nanometers or less, or about 25 nanometers or less. In some embodiments, the average alloy particle size is about, or at least about, 0.01 microns, 0.1 microns, 0.5 microns, 1 micron, 5 microns, 10 microns, or 20 microns. In various embodiments, the average alloy particle size is from about 0.01 microns to about 50 microns, or about 0.01 microns to about 20 microns, or about 0.01 microns to about 10 microns, or about 0.1 microns to about 50 microns, or about 0.1 microns to about 20 microns, or about 0.1 microns to about 10 microns, or about 0.1 microns to about 1 micron.

It is preferred that the average alloy particle size is smaller than the average base particle size, noting that there can be overlap depending on the particle-size distributions of the base particles and the alloy particles. In some embodiments, the average base particle size is at least 2, at least 3, at least 4, at least 5, at least 6, at least 7, at least 8, at least 9, or at least 10 times larger than said average alloy particle size.

The alloying powder may have a narrow or wide particle-size distribution, although a narrow size distribution is preferred. In various embodiments, the alloy powder particle-size dispersity index is about 0.01, 0.02, 0.05, 0.1, 0.2, 0.3, 0.4, or 0.5.

The particle-size distribution of the alloying powder may also be characterized by reference to D10, D50, and D90, for example. In various embodiments, D10 for the alloying powder is about 0.01, 0.05, 0.1, 0.2, 0.5, 1, 2, 3, 4, 5, 10, 15, or 20 microns while D90 for the alloying powder is about 0.02, 0.05, 0.1, 0.2, 0.5, 1, 2, 3, 4, 5, 10, 20, 30, 40, 50, 60, 70, or 80 microns.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The alloying powder preferably contains alloying particles that are nominally spherical. The same definition as for the particles of the base powder applies, i.e., "nominally spherical" alloy particles have an average sphericity of at least 0.9, preferably at least 0.95, and more preferably at least 0.99, wherein the sphericity is the ratio of the surface area of a reference sphere, having the same volume as the given alloy particle, to the surface area of the alloy particle.

In some embodiments, the alloying powder is a particle mixture with at least two different compositions. In these or other embodiments, the alloying powder comprises at least two, at least three, at least four, at least five, or more of the alloy elements disclosed herein. The alloying powder may itself be an alloy of Cr and/or Zr.

Hydrides, carbides, oxides, nitrides, borides, or sulfides of an alloy element (Cr, Zr, or others) may be desirable, compared to the pure form, for various reasons including stability, cost, or other factors. For example, in certain embodiments, hydrogen-stabilized zirconium particles ($ZrH_2$) are preferred over pure Zr particles due to $ZrH_2$ stability in air and ability to decompose at the melting temperature, resulting in formation of a favorable $Al_3Zr$ nucleant phase (intermetallic precipitate). The hydrogen evolves from the system and does not interfere with the alloying chemistry. In certain embodiments, hydrogen, carbon, oxygen, nitrogen, boron, or sulfur are incorporated into the final aluminum alloy. Carbon and boron, in particular, may be additional alloy elements.

The feedstock powder further may comprise from about 0.1 wt % to about 15 wt % of one or more additional alloy elements selected from the group consisting of Zn, Si, Mg, Cu, Li, Ag, Mn, Fe, Co, Ni, Sn, Sb, Bi, Pb, B, C, Ir, Os, Re, Ca, Sr, Be; hydrides, carbides, oxides, nitrides, borides, or sulfides thereof; and combinations or alloys of any of the foregoing, wherein wt % is based on the total weight concentration, on an elemental basis, of the additional alloy elements. These additional alloy elements may be present within the aluminum-containing base powder, or may be provided as a separate component within the overall feedstock powder.

It is known that some high-vapor-pressure elements, such as Zn and Mg, evaporate more rapidly during additive manufacturing and therefore the feedstock powder composition may be adjusted to contain an excess of these light element(s) so that the correct final composition, for the intended aluminum alloy, is achieved after additive manufacturing. This specification hereby incorporates by reference commonly owned U.S. patent application Ser. No. 15/996,438, filed on Jun. 2, 2018, which teaches how to enrich feedstock powders for additive manufacturing with certain light elements in order to achieve a desired final concentration of the additively manufactured component.

In certain embodiments, the aluminum-containing base powder is a 2000 series aluminum alloy. In certain embodiments, the aluminum-containing base powder contains from about 2 wt % to about 6 wt % Cu, from 0 to about 0.6 wt % Mn, and from 0 to about 0.8 wt % Si. The final aluminum alloy (following additive manufacturing) may be considered a modified 2000-series aluminum alloy, such as a modified 2219 aluminum alloy.

The aluminum-containing base powder may be selected from the 1000 series, 2000 series, 3000 series, 4000 series, 5000 series, 6000 series, 7000 series, 8000 series, or a combination thereof.

The aluminum-containing base powder may be selected from the 2000 series of aluminum alloys. The 2000 series of aluminum alloys includes aluminum alloys 2011, 2014, 2024, 2036, 2048, 2055, 2090, 2091, 2099, 2124, 2195, 2218, 2219, 2319, and 2618. In certain embodiments, the aluminum alloy is selected from aluminum alloy 2024, aluminum alloy 2219, or a combination thereof.

The aluminum-containing base powder may be selected from the 6000 series of aluminum alloys. The 6000 series of aluminum alloys includes aluminum alloys 6005, 6009, 6010, 6060, 6061, 6063, 6063A, 6065, 6066, 6070, 6081, 6082, 6101,6105, 6151, 6162, 6201, 6205, 6262, 6351, 6463, and 6951. In certain embodiments, the aluminum alloy is selected from aluminum alloy 6061, aluminum alloy 6063, or a combination thereof.

The aluminum-containing base powder may be selected from the 7000 series of aluminum alloys. The 7000 series of aluminum alloys includes aluminum alloys 7005, 7034, 7039, 7049, 7050, 7068, 7072, 7075, 7175, 7079, 7116, 7129, 7178, and 7475. In certain embodiments, the aluminum alloy is selected from aluminum alloy 7050, aluminum alloy 7075, or a combination thereof.

In other embodiments, the aluminum-containing base powder is substantially pure aluminum (e.g., at least 99 wt %, 99.5 wt %, or 99.9 wt % Al).

In certain embodiments, the powder feedstock consists essentially of Al and Cr, or Al and Zr, or Al and Cr and Zr.

The feedstock powder may be utilized in any powder-based additive manufacturing process, including, but not limited to, selective laser melting (SLM), electron beam melting (EBM), or laser engineered net shaping (LENS). In certain embodiments, the feedstock powder is first converted into another form of feedstock, such as a wire, which may be formed itself via additive manufacturing, extrusion, wire drawing, or other metal-processing techniques. The feedstock object (e.g., wire) may then be subjected to additive manufacturing.

A "melt-pool temperature" refers to a temperature that characterizes a melt pool, which temperature may be a melt-pool volume-average temperature, a melt-pool time-average temperature, a melt-pool surface temperature, or a melt-pool peak temperature (the highest temperature reached by any surface or region within the melt pool). For a melt-pool time-average temperature, the time is the time span for the creation and solidification of a melt pool in an additive manufacturing or welding process. A melt-pool temperature may also be an overall average temperature, averaged over both space and time.

A melt-pool temperature will vary depending at least on the specific metals to be melted, the power intensity applied to the melt pool, and the geometry of the melt pool. A melt-pool temperature may vary from about 800° C. to about 2000° C., such as about, or at least about, 900° C., 1000° C., 1100° C., 1200° C., 1300° C., 1400° C., 1500° C., 1600° C., 1700° C., 1800° C., or 1900° C., for example, noting that these temperatures may be volume-average temperatures, time-average temperatures, surface temperatures, and/or peak temperatures of the melt pool. In various embodiments, a selected high-vapor-pressure metal has a vapor pressure of 1 kPa or greater at 1000° C., 1100° C., 1200° C., 1300° C., 1400° C., 1500° C., 1600° C., 1700° C., or 1800° C.

Additive manufacturing via selective laser melting, electron beam melting, or laser engineered net shaping can process feedstock powders into alloy parts with uniform distribution (good dispersion) of Al—Cr and/or Al—Zr precipitates to provide strength and ductility. During local heating to high temperatures, but below the melting point of Cr or Zr, the alloy element(s) are dissolved and/or suspended in the melt pool. A high energy input leads to preferred turbulent mixing of the melt pool, ensuring a uniform composition within the melt pool. Rapid cooling of the melt pool leads to uniform precipitation and mitigates agglomeration and coarsening of the precipitates. Additional heat treatments, such as aging heat treatments, may then be used to optimize the precipitate size and overall microstructure, if desired.

In some embodiments, the alloying powder itself contains intermetallic inclusions $Al_nA_m$, i.e., the inclusions are made prior to the additive manufacturing process and added to the feedstock powder itself. The intermetallic inclusions $Al_nA_m$ may be in addition to, or in place of, alloy elements X or hydrides, carbides, oxides, nitrides, or sulfides thereof. Stated another way, aluminides of alloy elements X may be included in the alloying powder.

The disclosed feedstock powders, and/or the disclosed aluminum alloy, may be made from, or employed in, additive manufacturing, welding, pressing, sintering, mixing, dispersing, friction stir welding, extrusion, binding (such as with a polymer binder), melting, semi-solid melting, casting, or a combination thereof. Melting may include induction melting, resistive melting, skull melting, arc melting, laser melting, electron beam melting, semi-solid melting, or other types of melting (including conventional and non-conventional melt processing techniques). Casting may include centrifugal, pour, or gravity casting, for example. Sintering may include spark discharge, capacitive-discharge, resistive, or furnace sintering, for example. Mixing may include convection, diffusion, shear mixing, or ultrasonic mixing, for example.

An additive-manufacturing process may be selected from the group consisting of selective laser melting, energy-beam melting, laser engineered net shaping, and combinations thereof, for example. The solidification rate may vary in additive manufacturing from about 0.01 m/s to about 10 m/s, such as from about 0.1 m/s to about 5 m/s, for example.

The additive-manufacturing feedstock may be of any compatible size for common or custom additive manufacturing equipment. When the feedstock is in the form of powder, the powder particles may have an average diameter from about 1 micron to about 500 microns, such as about 10 microns to about 100 microns, for example. When the feedstock is in the form of a wire, the wire may have an average diameter from about 10 microns to about 1000 microns, such as about 50 microns to about 500 microns, for example.

A powdered feedstock may be in any form in which discrete particles can be reasonably distinguished from each other. The powder may be present as loose powders, a paste, a suspension, or a green body, for example. A green body is an object whose main constituent is weakly bound powder material, before it has been melted and solidified.

In some embodiments, the metal-containing feedstock may be in the form of a powder with an average particle size from about 5 microns to about 150 microns, for example. In some embodiments, the average particle size is about 10, 20, 30, 40, 50, 60, 70, 80, 90, or 100 microns.

By "component" it is meant any object that is additively manufactured, with arbitrary geometry and size. During additive manufacturing, material is deposited layer by layer to build up a part of arbitrary geometry. Conventional processing such as casting or machining is limited by process-specific design criteria or line-of-sight manufacturing, which restricts the potential geometries. Additive manufacturing overcomes these limitations by starting with powder or wire material at a finer scale than the target geometries being built, and locally melting or sintering these materials together to build the component from the ground up. In principle, any geometry can be created.

The energy source is preferably a laser-diode energy source, such as one configured with a laser energy density from 10 J/mm$^3$ to 2000 J/mm$^3$. In various embodiments, the laser-diode energy source is configured with a laser energy density of about 10, 50, 100, 200, 300, 400, 500, 600, 700, 800, 900, 1000, 1100, 1200, 1300, 1400, 1500, 1600, 1700, 1800, 1900, or 2000 J/mm$^3$. Laser diodes operate at shorter laser wavelengths (e.g., 808 nm) than conventional fiber lasers (e.g., 1064 nm), enabling more efficient-energy absorption, in some embodiments.

Conventional additive manufacturing utilizes a rastering laser to build parts up layer by layer. A process utilizing a gradient energy pattern (e.g., from a laser-diode system) allows a 2D exposure to be projected onto a powder bed to produce a large area melt pool in the shape of the layer which is meant to be built. Use of a gradient energy pattern has the advantage of speeding up the additive-manufacturing process.

Additive manufacturing may utilize an exposure time (to the energy source) from 1 microsecond to 1 minute, for example. In various embodiments, the exposure time is about 10 microsecond, 100 microseconds, 1 millisecond, 10 milliseconds, 100 milliseconds, 1 second, or 10 seconds. The exposure time may be readily varied by turning on and off the energy source, or by spatially controlling the energy source, for example.

Additive manufacturing may be controlled to maintain an average thermal gradient from 10 K/m to $10^6$ K/m within the first melt layer and/or additional melt layers, such as about, or less than about, 10, $10^2$, $10^3$, $10^4$, or $10^5$ K/m. In some embodiments, the average thermal gradient is below $10^5$ K/m or below $10^3$ K/m within the first melt layer and/or additional melt layers. In various embodiments, the average thermal gradient in step (c) is from 10 to 100 K/m, or from 10 to $10^3$ K/m, or from 10 to $10^4$ K/m, or from 10 to $10^5$ K/m, for example.

In some embodiments, the powder bed temperature is from about room temperature (e.g., about 25° C.) to about a temperature that is within 50° C. of the solidus temperature (the highest temperature at which the metal alloy is a solid).

Additive manufacturing may be controlled to maintain an average thermal gradient below $10^6$ K/m (in magnitude) within the first solid layer and/or within additional solid layers. Additive manufacturing may be controlled to maintain an average thermal gradient from 10 K/m to $10^6$ K/m within the first solid layer and/or within additional solid layers, such as about, or less than about, 10, $10^2$, $10^3$, $10^4$, or $10^5$ K/m. In some embodiments, the average thermal gradient is below $10^5$ K/m or below $10^3$ K/m within the first solid layer and/or within additional solid layers. In various embodiments, the average thermal gradient is from 10 to 100 K/m, or from 10 to $10^3$ K/m, or from 10 to $10^4$ K/m, or from 10 to $10^5$ K/m, for example.

Additive manufacturing may be controlled to maintain an average solidification velocity from 0.01 m/s to 10 m/s within the first solid layer and/or within additional solid layers. In various embodiments, the average solidification velocity is about, less than about, or greater than about 0.01, 0.1, 0.5, 1, 1.5, 2, 3, 4, or 5 m/s within the first solid layer and/or within additional solid layers.

The first solid layer may have a thickness from 10 microns to 500 microns, for example. Additional solid layers may have an average thickness from 10 microns to 500 microns, for example. In various embodiments, the first layer and/or additional layers may have a thickness of about 10, 20, 30, 40, 50, 75, 100, 150, 200, 250, 300, 350, 400, 450, or 500 microns. The layer thickness may vary along the additive-manufacturing build direction or the layer thickness may be constant.

The method may further comprise repeating the melting and solidification steps a plurality of times to generate a plurality of solid layers by sequentially solidifying a plurality of melt layers in an additive-manufacturing build direction. The method is not limited in principle to the number of solid layers that may be fabricated. A "plurality of solid layers" means at least 2 layers, such as at least 10 individual solid layers in the additively manufactured component. The number of solid layers may be much greater than 10, such as about 100, 1000, 10000, or more. The plurality of solid layers may be characterized by an average layer thickness of at least 10 microns, such as about, or at least about, 10, 20, 30, 40, 50, 75, 100, 150, 200, 250, 300, 350, 400, 450, or 500 microns.

In some embodiments, an additively manufactured aluminum alloy microstructure has a crystallographic texture that is not solely oriented in an additive-manufacturing build direction. For example, the additively manufactured aluminum alloy microstructure may contain a plurality of dendrite layers having differing primary growth-direction angles with respect to each other.

Selective laser melting is an additive manufacturing technique designed to use a high power-density laser to melt and fuse metallic powders together. Selective laser melting has the ability to fully melt the metal material into a solid 3D part.

Electron-beam melting is a type of additive manufacturing for metal parts. Metal powder is welded together, layer by layer, under vacuum using an electron beam as the heat source.

Laser engineered net shaping is an additive manufacturing technique developed for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication as well.

In any of these additive manufacturing techniques, post-production processes such as heat treatment, light machining, surface finishing, coloring, stamping, or other finishing operations may be applied. Also, several additive manufactured parts may be joined together (e.g., sintered) chemically or physically to produce a final object.

EXAMPLES

Materials and Methods

A starting aluminum (Al) powder is surface-functionalized with zirconium particles (as $ZrH_2$) in Example 1, or with both zirconium particles (as $ZrH_2$) as well as chromium (as Cr) particles in Examples 2 to 6, in concentrations stated below. The average particle size of the zirconium particles is at least an order of magnitude smaller than the average particle size of the Al powder, and the average particle size of the chromium particles is at least an order of magnitude smaller than the average particle size of the Al powder. Trace elements include Fe and Si in the surface-functionalized Al powder.

The resulting surface-functionalized feedstock powder is processed into parts and test specimens by selective laser melting using a Concept Laser M2 3D printer (Concept Laser GmbH, Grapevine, Texas, USA) to build parts layer-by-layer. Processing is done under a flowing, inert argon atmosphere with oxygen monitoring. Samples are removed from the machine and dried with clean, dry air.

Tensile tests are performed on a servo-electric INSTRON 5960 frame equipped with a 50-kN load cell. Samples are clamped by the ends of dog-bone-shaped samples. The extension rate is 0.2 mm/min and samples are loaded until fracture. Testing is conducted following ASTM E8. Hardness tests are performed to measure the Vickers Pyramid Number, denoted as "HV". X-ray diffraction measurements are performed using a standard XRD diffractometer.

Example 1: Production of Aluminum Alloy With 4 at % Zr

An aluminum alloy with composition Al-4 wt % Zr (no Cr) is processed via additive manufacturing.

Figure 8:
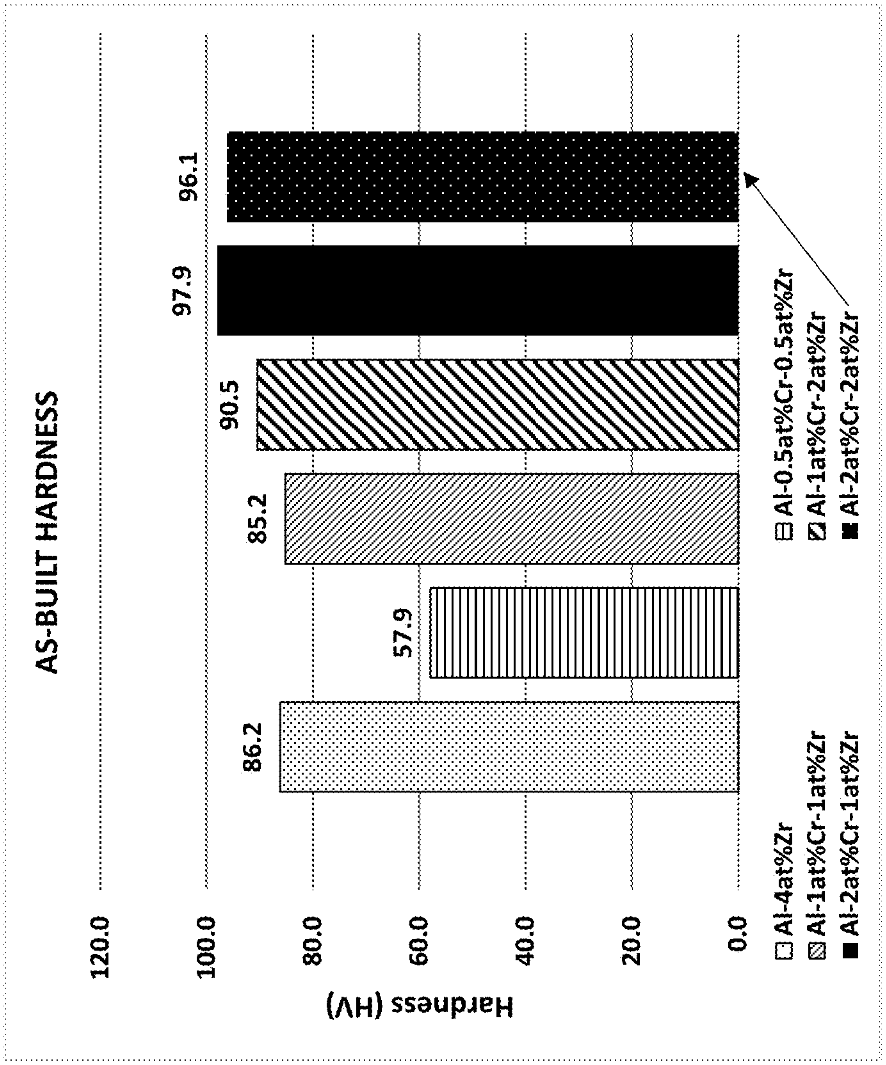
FIG. 8 is a plot of the as-built hardness of the aluminum alloys of Examples 1, 2, 3, 4, 5, and 6.
Figure 9:
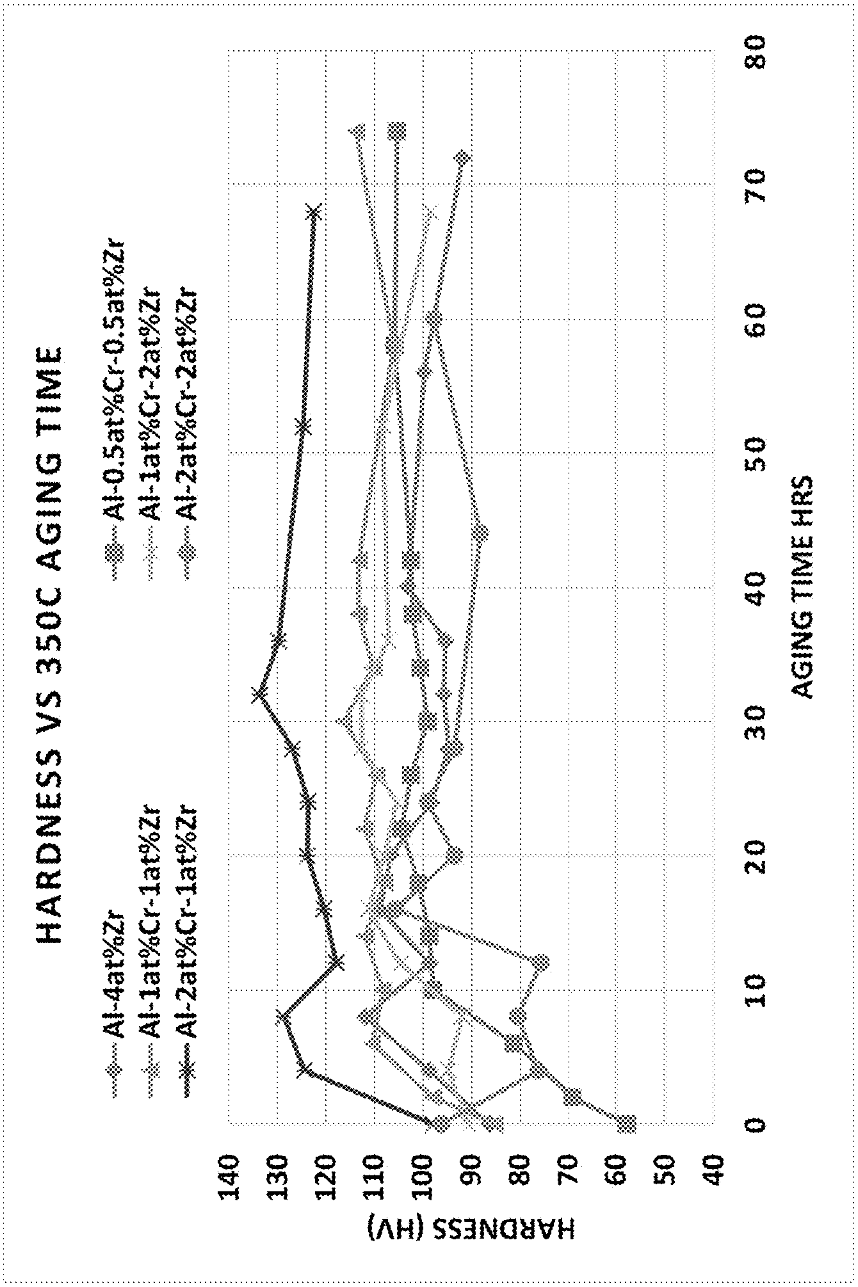
FIG. 9 is a plot of aluminum alloy hardness versus aging time, at a fixed aging temperature of 350° C., in Examples 1, 2, 3, 4, 5, and 6.

As shown in FIG. 8, the as-built hardness of this aluminum alloy is HV=86.2. FIG. 9 shows the beneficial impact of aging time, at a fixed aging temperature of 350° C., on the aluminum alloy hardness.

Figure 10:
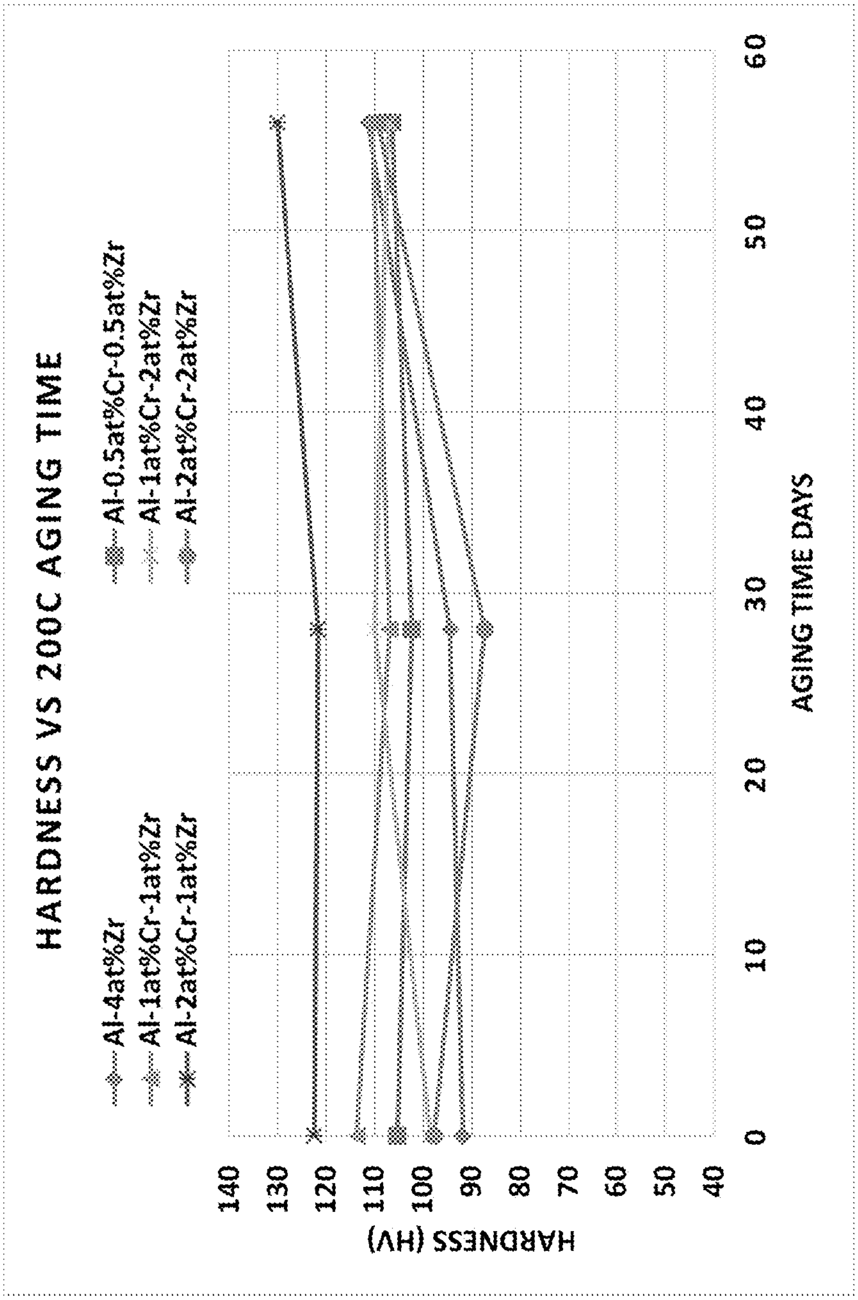
FIG. 10 is a plot of aluminum alloy hardness versus aging time, at a fixed aging temperature of 200° C., in Examples 1, 2, 3, 4, 5, and 6.

FIG. 10 shows the moderate impact of additional aging, at a fixed aging temperature of 200° C., on the aluminum alloy hardness. The samples shown in FIG. 10 has been previously aged at 350° C. for about 70 hours, showing that a temperature of 200° C. has little to no effect on HV over prolonged periods of time.

Figure 12:
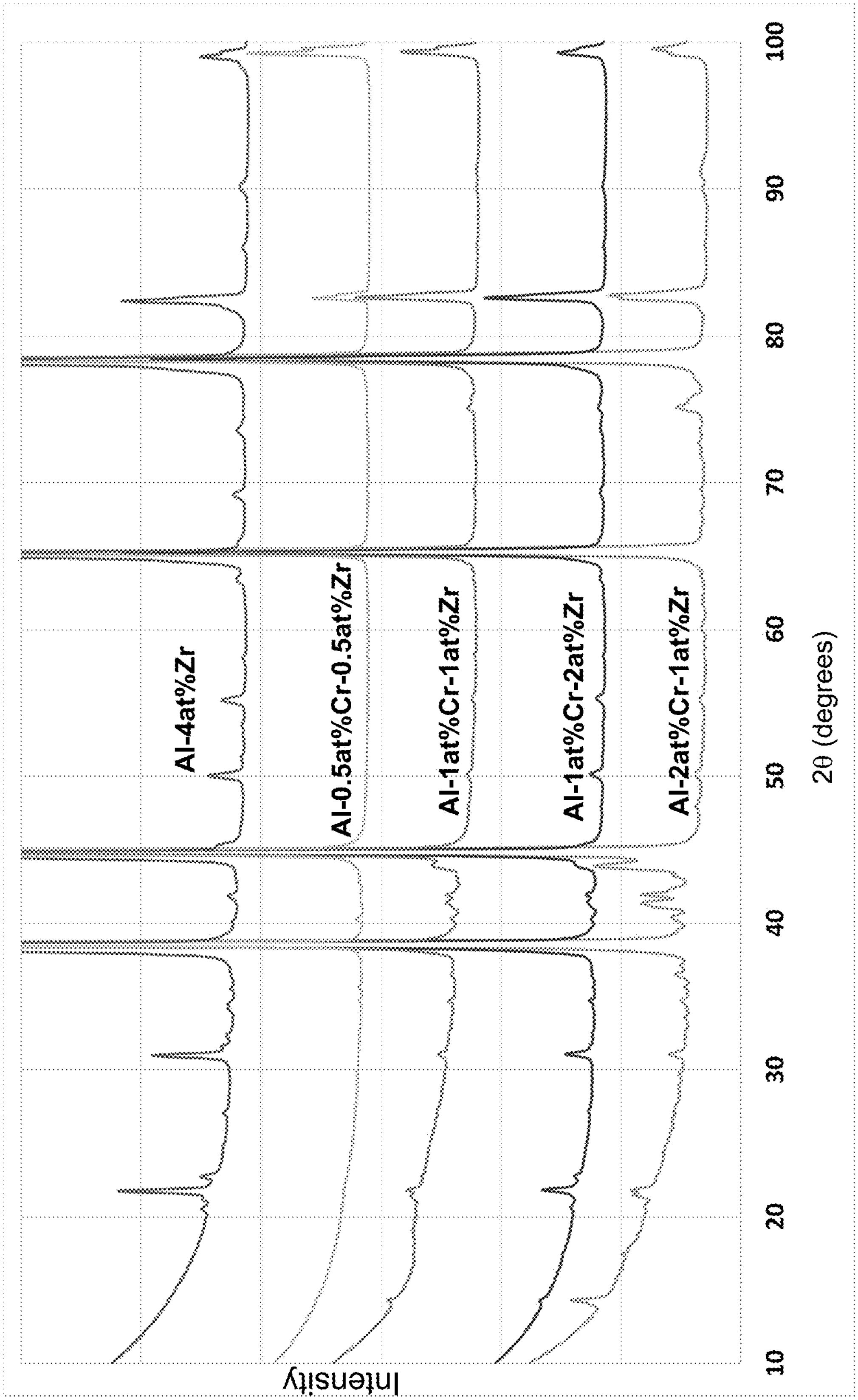
FIG. 12 shows X-ray diffraction patterns of the aluminum alloys of Examples 1, 2, 3, 4, and 5.

The X-ray diffraction pattern of the aluminum alloy, aged at 350° C. for 32 hours, is shown in FIG. 12.

Example 2: Production of Aluminum Alloy with 0.5 at % Cr and 0.5 at % Zr

An aluminum alloy with composition Al-0.5 wt % Cr-0.5 wt % Zr is processed via additive manufacturing.

Figure 3:
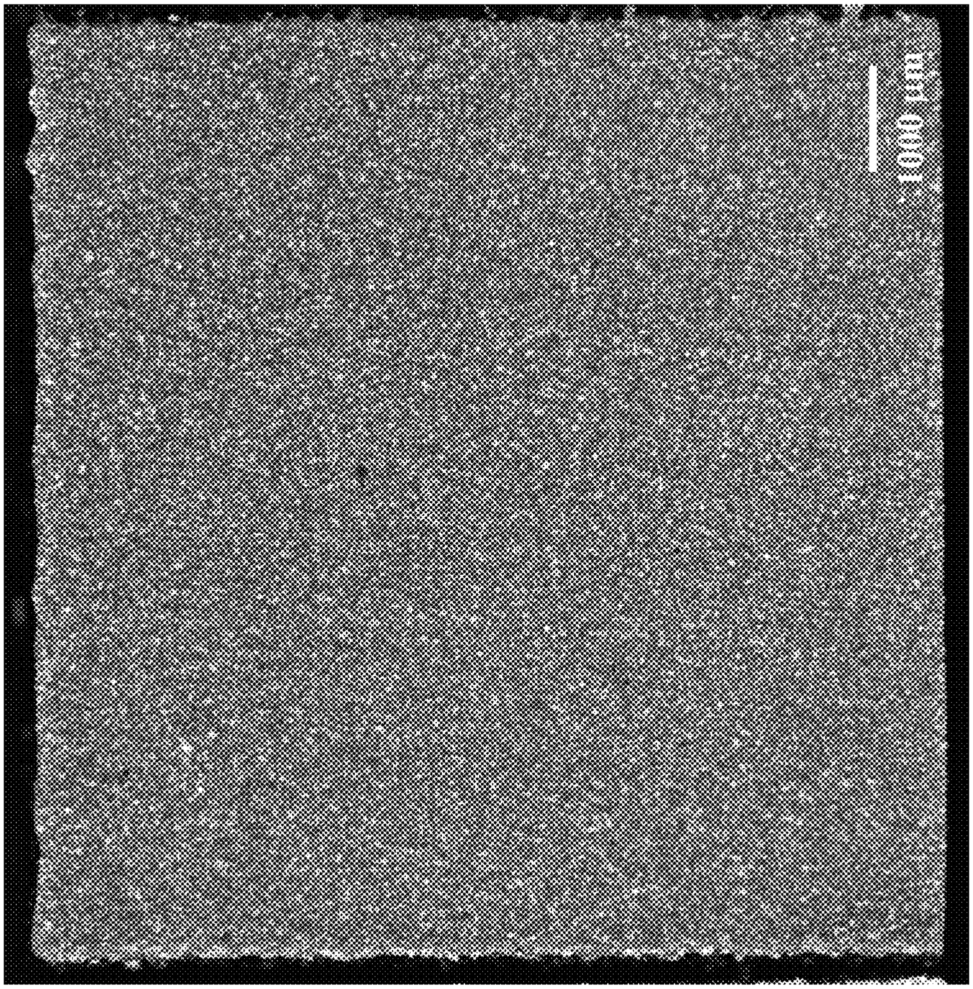
FIG. 3 is a photomicrograph of the surface of the additively manufactured aluminum alloy (scale bar=1000 microns), in Example 2.

FIG. 3 shows a photomicrograph of the surface of the additively manufactured aluminum alloy (scale bar=1000 microns).

As shown in FIG. 8, the as-built hardness of this aluminum alloy is HV=57.9. FIG. 9 shows the beneficial impact of aging time, at a fixed aging temperature of 350° C., on the aluminum alloy hardness.

FIG. 10 shows the moderate impact of additional aging, at a fixed aging temperature of 200° C., on the aluminum alloy hardness. The samples shown in FIG. 10 has been previously aged at 350° C. for about 70 hours, showing that a temperature of 200° C. has little to no effect on HV over prolonged periods of time.

The X-ray diffraction pattern of the aluminum alloy, aged at 350° C. for 32 hours, is shown in FIG. 12.

Example 3: Production of Aluminum Alloy with 1.0 at % Cr and 1.0 at % Zr

An aluminum alloy with composition Al-1.0 wt % Cr-1.0 wt % Zr is processed via additive manufacturing.

Figure 4:
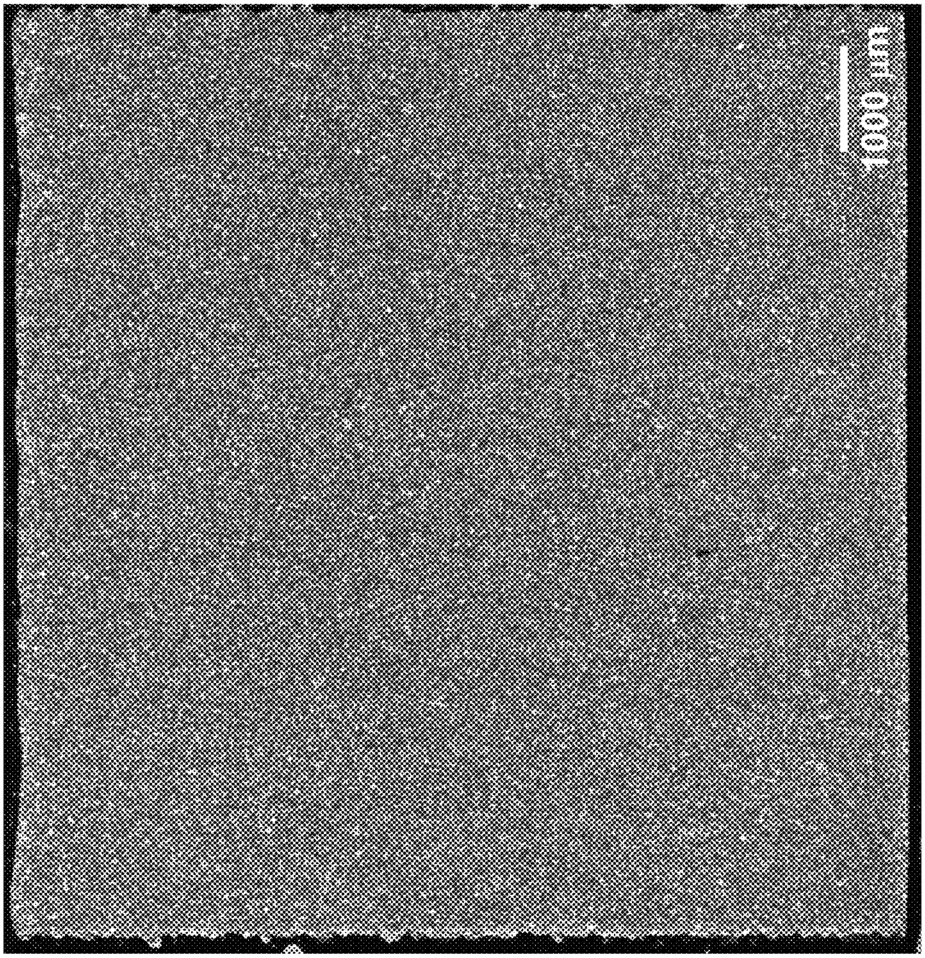
FIG. 4 is a photomicrograph of the surface of the additively manufactured aluminum alloy (scale bar=1000 microns), in Example 3.

FIG. 4 shows a photomicrograph of the surface of the additively manufactured aluminum alloy (scale bar=1000 microns).

As shown in FIG. 8, the as-built hardness of this aluminum alloy is HV=85.2. FIG. 9 shows the beneficial impact of aging time, at a fixed aging temperature of 350° C., on the aluminum alloy hardness.

FIG. 10 shows the moderate impact of additional aging, at a fixed aging temperature of 200° C., on the aluminum alloy hardness. The samples shown in FIG. 10 has been previously aged at 350° C. for about 70 hours, showing that a temperature of 200° C. has little to no effect on HV over prolonged periods of time.

The X-ray diffraction pattern of the aluminum alloy, aged at 350° C. for 32 hours, is shown in FIG. 12.

Example 4: Production of Aluminum Alloy with 1.0 at % Cr and 2.0 at % Zr

An aluminum alloy with composition Al-1.0 wt % Cr-2.0 wt % Zr is processed via additive manufacturing.

Figure 5:
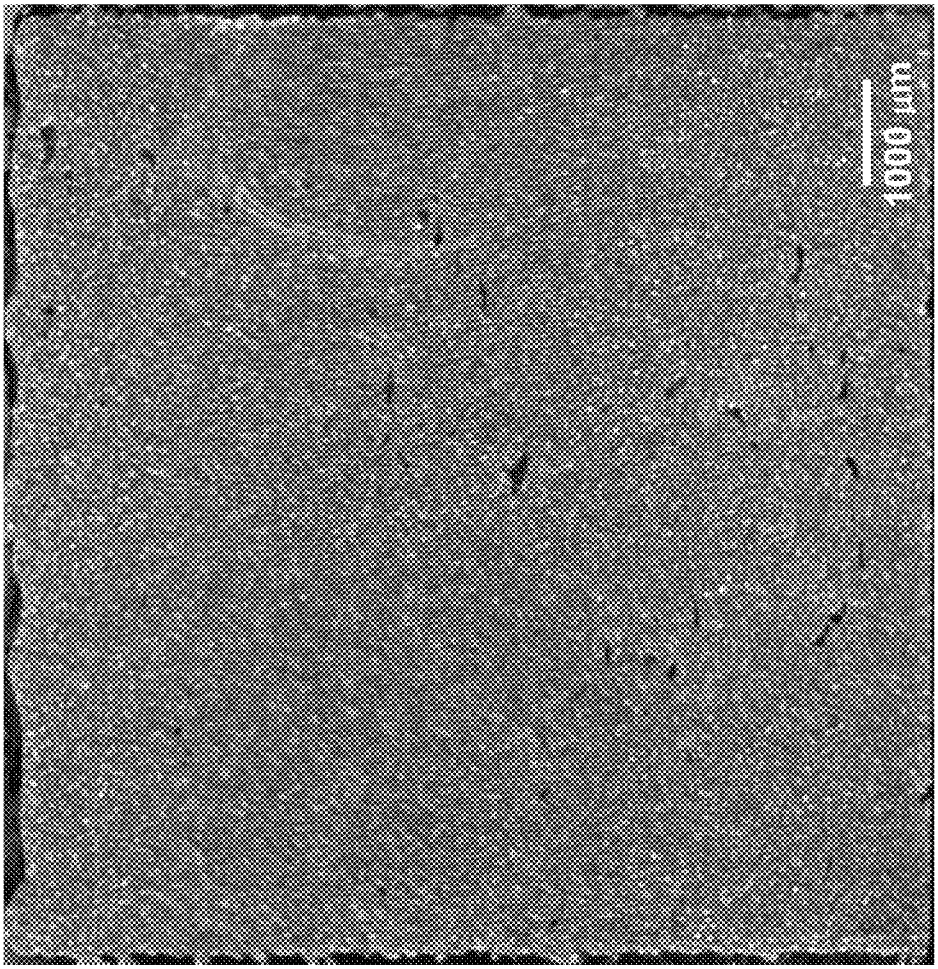
FIG. 5 is a photomicrograph of the surface of the additively manufactured aluminum alloy (scale bar=1000 microns), in Example 4.

FIG. 5 shows a photomicrograph of the surface of the additively manufactured aluminum alloy (scale bar=1000 microns). A minor amount of porosity is present in the material.

As shown in FIG. 8, the as-built hardness of this aluminum alloy is HV=90.5. FIG. 9 shows the beneficial impact of aging time, at a fixed aging temperature of 350° C., on the aluminum alloy hardness.

FIG. 10 shows the moderate impact of additional aging, at a fixed aging temperature of 200° C., on the aluminum alloy hardness. The samples shown in FIG. 10 has been previously aged at 350° C. for about 70 hours, showing that a temperature of 200° C. has little to no effect on HV over prolonged periods of time.

The X-ray diffraction pattern of the aluminum alloy, aged at 350° C. for 32 hours, is shown in FIG. 12.

Example 5: Production of Aluminum Alloy with 2.0 at % Cr and 1.0 at % Zr

An aluminum alloy with composition Al-2.0 wt % Cr-1.0 wt % Zr is processed via additive manufacturing.

Figure 6:
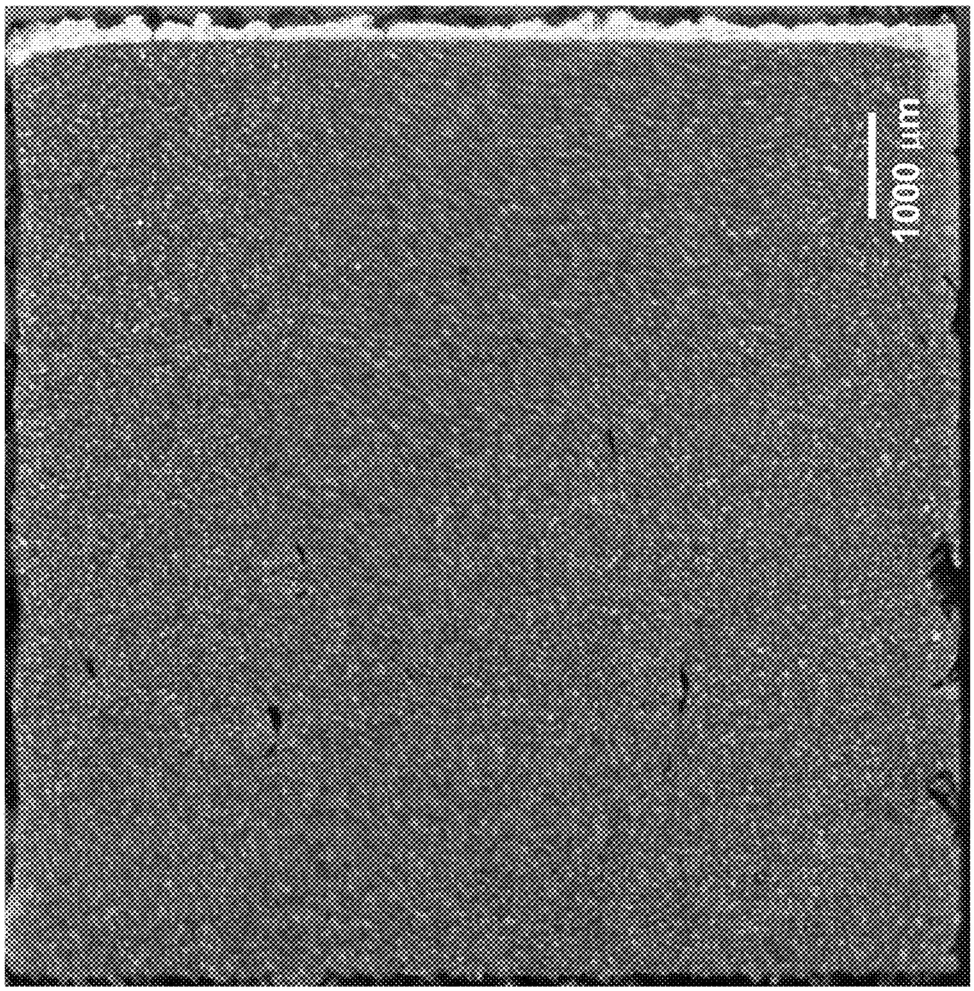
FIG. 6 is a photomicrograph of the surface of the additively manufactured aluminum alloy (scale bar=1000 microns), in Example 5.

FIG. 6 shows a photomicrograph of the surface of the additively manufactured aluminum alloy (scale bar=1000 microns).

As shown in FIG. 8, the as-built hardness of this aluminum alloy is HV=97.9. FIG. 9 shows the beneficial impact of aging time, at a fixed aging temperature of 350° C., on the aluminum alloy hardness.

FIG. 10 shows the moderate impact of additional aging, at a fixed aging temperature of 200° C., on the aluminum alloy hardness. The samples shown in FIG. 10 has been previously aged at 350° C. for about 70 hours, showing that a temperature of 200° C. has little to no effect on HV over prolonged periods of time.

Figure 11:
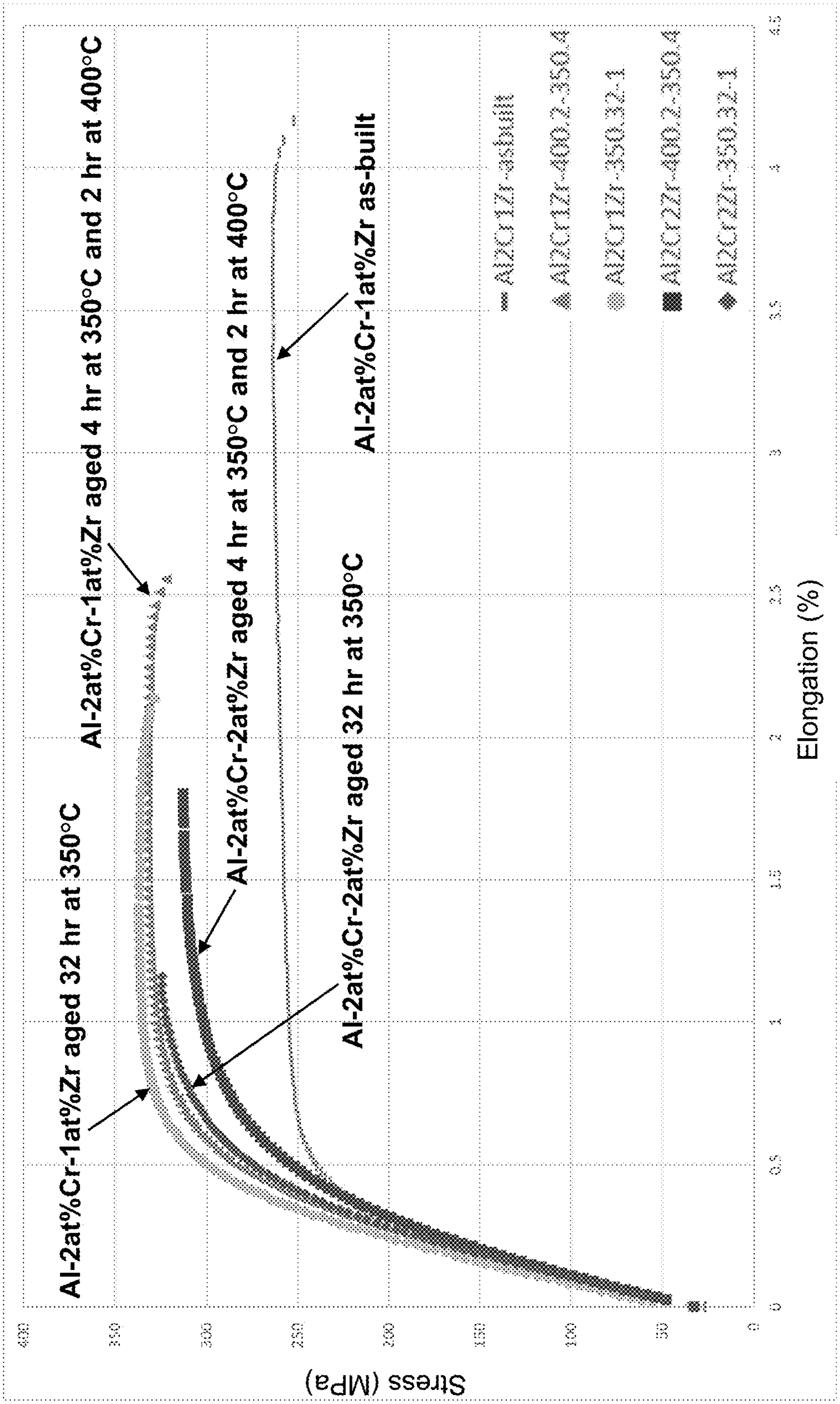
FIG. 11 shows tensile stress versus elongation for aluminum alloys of Examples 5 and 6, with various heat treatments.

FIG. 11 shows tensile stress versus elongation for the aluminum alloy. The ultimate tensile strength is about 263 MPa. FIG. 11 also shows that when this aluminum alloy is aged for 32 hours at 350° C., the ultimate tensile strength increases to about 337 MPa. FIG. 11 also shows that when this aluminum alloy is aged for 4 hours at 350° C. and 2 hours at 400° C., the ultimate tensile strength increases to about 333 MPa.

The X-ray diffraction pattern of the aluminum alloy, aged at 350° C. for 32 hours, is shown in FIG. 12.

Example 6: Production of Aluminum Alloy with 2.0 at % Cr and 2.0 at % Zr

An aluminum alloy with composition Al-2.0 wt % Cr-2.0 wt % Zr is processed via additive manufacturing.

Figure 7:
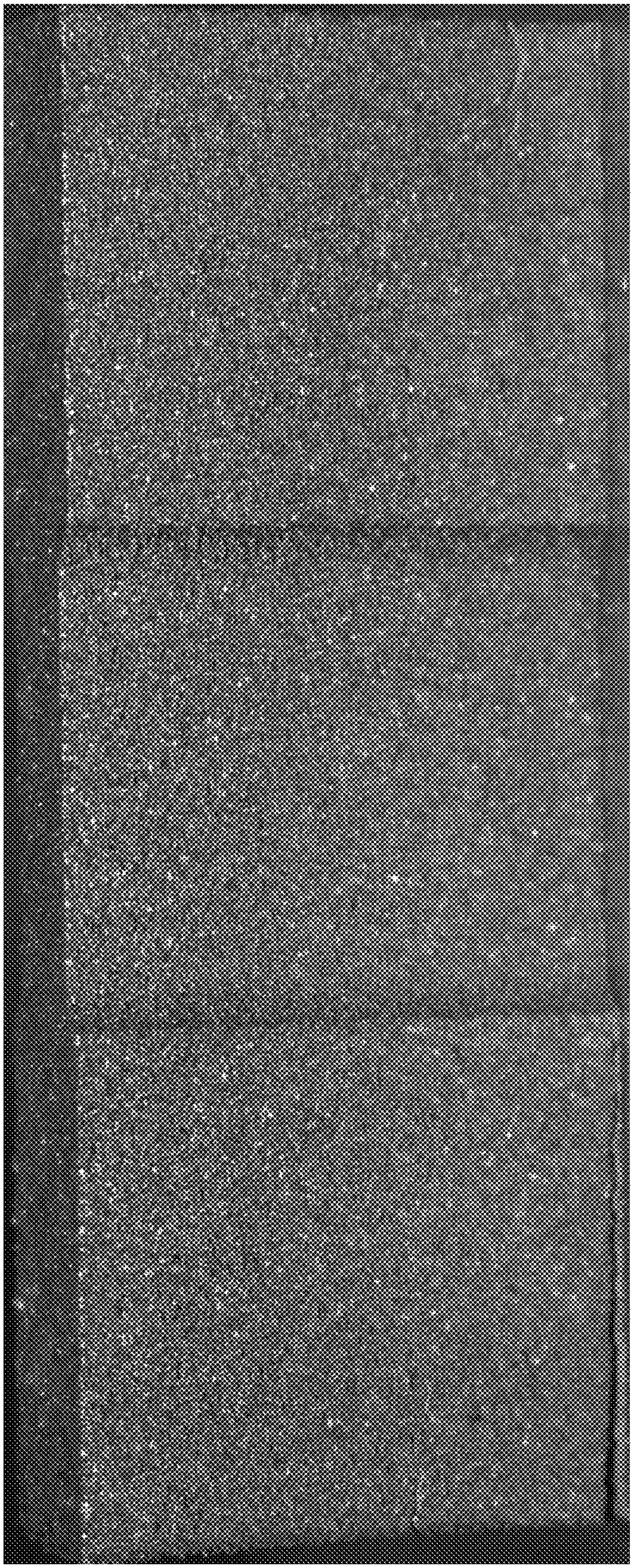
FIG. 7 is a photomicrograph of the surface of the additively manufactured aluminum alloy fabricated in the form of a dogbone, in Example 6.

FIG. 7 shows a photomicrograph of the surface of the additively manufactured aluminum alloy that is fabricated in the form of a dogbone.

As shown in FIG. 8, the as-built hardness of this aluminum alloy is HV=96.1. FIG. 9 shows the moderate impact of aging time, at a fixed aging temperature of 350° C., on the aluminum alloy hardness.

FIG. 10 shows the moderate impact of additional aging, at a fixed aging temperature of 200° C., on the aluminum alloy hardness. The samples shown in FIG. 10 has been previously aged at 350° C. for about 70 hours, showing that a temperature of 200° C. has little to no effect on HV over prolonged periods of time.

FIG. 11 shows tensile stress versus elongation for the aluminum alloy aged at different conditions. FIG. 11 shows that when this aluminum alloy is aged for 32 hours at 350° C., the ultimate tensile strength is about 325 MPa. FIG. 11 also shows that when this aluminum alloy is aged for 4 hours at 350° C. and 2 hours at 400° C., the ultimate tensile strength is about 313 MPa.

This invention can be broadly applied to structures containing aluminum alloys that exhibit high strength at temperatures up to 300° C. or higher. Such structures include, for example, aluminum-alloy structures in the propulsion and exhaust system of commercial and military aircraft that are exposed to elevated temperatures; aluminum-alloy structures of high-speed vehicles that are exposed to elevated temperatures due to aerothermal heating; and motor-vehicle powertrain aluminum-alloy parts that are exposed to elevated temperatures, such as pistons, connecting rods, cylinder heads, and brake calipers. Other potential applications include improved tooling, replacement of steel or titanium components at lower weight, full topological optimization of aluminum components, low-cost replacement for out-of-production components, and replacement of existing additively manufactured aluminum systems.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An aluminum alloy consisting essentially of:

(a) aluminum (Al);

(b) at least 0.1 at % zirconium (Zr);

(c) at least 0.1 at % chromium (Cr);

(d) at least 0.1 at % of cobalt (Co) and/or nickel (Ni);

(e) at least 0.1 at % magnesium (Mg);

(f) at least 0.1 at % manganese (Mn); and (g) less than 1 at % total other elements, wherein said aluminum alloy is characterized by a tensile strength of at least 500 MPa.

2. The aluminum alloy of claim 1, wherein said aluminum alloy is thermally stable at 400° C.

3. The aluminum alloy of claim 1, wherein said aluminum alloy is in the form of an additively manufactured object.

4. An aluminum alloy containing:

(a) aluminum (Al);

(b) at least 0.5 at % zirconium (Zr);

(c) at least 0.5 at % chromium (Cr); and (d) at least 0.5 at % of cobalt (Co) and/or nickel (Ni), wherein said aluminum alloy is in the form of an additively manufactured object, wherein said aluminum alloy is characterized by a tensile strength of at least 500 MPa, and wherein said aluminum alloy is thermally stable at 400° C.

* * * * *